US008344610B2

(12) United States Patent
Bukesov et al.

(10) Patent No.: US 8,344,610 B2
(45) Date of Patent: Jan. 1, 2013

(54) SCANNING BEAM DISPLAYS BASED ON LIGHT-EMITTING SCREENS HAVING PHOSPHORS

(75) Inventors: Sergey A. Bukesov, Acton, MA (US); Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 0 days.

(21) Appl. No.: 13/205,582

(22) Filed: Aug. 8, 2011

(65) Prior Publication Data

US 2011/0291554 A1 Dec. 1, 2011

Related U.S. Application Data

(63) Continuation of application No. 11/553,971, filed on Oct. 27, 2006, now Pat. No. 7,994,702, which is a continuation-in-part of application No. 11/116,998, filed on Apr. 27, 2005, now Pat. No. 7,474,286, and a continuation-in-part of application No. 11/335,813, filed on Jan. 18, 2006, now Pat. No. 7,791,561, and a continuation-in-part of application No. 11/337,170, filed on Jan. 19, 2006, now Pat. No. 7,733,310, and a continuation-in-part of application No. 11/510,495, filed on Aug. 24, 2006, now Pat. No. 8,089,425, and a continuation-in-part of application No. 11/514,720, filed on Aug. 31, 2006, now Pat. No. 8,000,005.

(60) Provisional application No. 60/798,415, filed on May 5, 2006, provisional application No. 60/799,316, filed on May 9, 2006.

(30) Foreign Application Priority Data

Mar. 31, 2006 (WO) ................ PCT/US2006/011757

(51) Int. Cl.
*H01J 1/62* (2006.01)
*G09G 3/34* (2006.01)

(52) U.S. Cl. .......................................... 313/498; 345/84
(58) Field of Classification Search ........................ None
See application file for complete search history.

(56) References Cited

U.S. PATENT DOCUMENTS 3,025,161 A 3/1962 Thaddeus
(Continued)

FOREIGN PATENT DOCUMENTS

EP 0196862 10/1986
(Continued)

OTHER PUBLICATIONS

Supplementary European Search Report dated Dec. 3, 2009 for Application No. EP 07 76 1919, 5 pages.

(Continued)

*Primary Examiner* — Anh Mai
*Assistant Examiner* — Britt D Hanley
(74) *Attorney, Agent, or Firm* — Perkins Coie LLP

(57) ABSTRACT

This specification describes phosphor compositions used in fluorescent layers for scanning beam displays. In general, one aspect of the subject matter described in this specification can be embodied in a display device having a fluorescent layer that absorbs an excitation light at a single wavelength and emits visible light. The fluorescent layer includes a plurality of parallel fluorescent stripes. At least three adjacent fluorescent stripes are made of three different fluorescent materials, which include a first fluorescent material that absorbs the excitation light and emits light of a first color, a second fluorescent material that absorbs the excitation light and emits light of a second color, and a third fluorescent material that absorbs the excitation light and emits light of a third color.

17 Claims, 10 Drawing Sheets

U.S. PATENT DOCUMENTS

| | | | |
|---|---|---|---|
| 3,114,065 A | 12/1963 | Kaplan | |
| 4,512,911 A | 4/1985 | Kotera et al. | |
| 4,661,419 A | 4/1987 | Nakamura | |
| 4,979,030 A | 12/1990 | Murata | |
| 5,080,467 A | 1/1992 | Kahn et al. | |
| 5,138,441 A | 8/1992 | Tanaka | |
| 5,140,604 A | 8/1992 | Alablanche et al. | |
| 5,198,679 A | 3/1993 | Katch et al. | |
| 5,473,396 A | 12/1995 | Okajima et al. | |
| 5,477,285 A | 12/1995 | Riddle et al. | |
| 5,587,818 A | 12/1996 | Lee | |
| 5,594,556 A | 1/1997 | Vronsky et al. | |
| 5,602,445 A | 2/1997 | Solanki et al. | |
| 5,614,961 A | 3/1997 | Gibeau et al. | |
| 5,648,181 A | 7/1997 | Watanabe | |
| 5,684,552 A | 11/1997 | Miyamoto et al. | |
| 5,698,857 A | 12/1997 | Lambert et al. | |
| 5,920,361 A | 7/1999 | Gibeau | |
| 5,976,424 A | 11/1999 | Weber et al. | |
| 5,998,925 A | 12/1999 | Shimizu | |
| 6,010,751 A | 1/2000 | Shaw et al. | |
| 6,057,953 A | 5/2000 | Ang | |
| 6,066,861 A | 5/2000 | Hohn et al. | |
| 6,168,892 B1 | 1/2001 | O'Hara et al. | |
| 6,172,810 B1 | 1/2001 | Fleming et al. | |
| 6,252,254 B1 | 6/2001 | Soules et al. | |
| 6,255,670 B1 | 7/2001 | Srivastava et al. | |
| 6,333,724 B1 | 12/2001 | Taira et al. | |
| 6,417,019 B1 | 7/2002 | Mueller et al. | |
| 6,531,230 B1 | 3/2003 | Weber et al. | |
| 6,532,120 B1 | 3/2003 | Harada et al. | |
| 6,576,156 B1 | 6/2003 | Ratna et al. | |
| 6,765,237 B1 | 7/2004 | Doxsee et al. | |
| 6,809,347 B2 | 10/2004 | Tasch et al. | |
| 6,900,916 B2 | 5/2005 | Okazaki et al. | |
| 6,905,220 B2 | 6/2005 | Wortman et al. | |
| 6,916,464 B2 | 7/2005 | Hansenne et al. | |
| 7,064,892 B2 | 6/2006 | Teng | |
| 7,474,286 B2 | 1/2009 | Hajjar et al. | |
| 7,994,702 B2 | 8/2011 | Bukesov et al. | |
| 8,007,683 B2 | 8/2011 | Starick et al. | |
| 2001/0050371 A1 | 12/2001 | Odaki et al. | |
| 2002/0002449 A1 | 1/2002 | Herman | |
| 2002/0003233 A1 | 1/2002 | Mueller-Mach et al. | |
| 2002/0008854 A1 | 1/2002 | Leigh Travis | |
| 2002/0145685 A1 | 10/2002 | Mueller-Mach et al. | |
| 2002/0185965 A1 | 12/2002 | Collins et al. | |
| 2004/0223100 A1 | 11/2004 | Kotchick et al. | |
| 2004/0227465 A1 | 11/2004 | Menkara et al. | |
| 2004/0263074 A1 | 12/2004 | Baroky et al. | |
| 2005/0001225 A1 | 1/2005 | Yoshimura et al. | |
| 2005/0023962 A1 | 2/2005 | Menkara et al. | |
| 2005/0023963 A1 | 2/2005 | Menkara et al. | |
| 2006/0076883 A1 | 4/2006 | Himaki et al. | |
| 2006/0197922 A1 | 9/2006 | Liu et al. | |
| 2006/0221021 A1 | 10/2006 | Hajjar et al. | |
| 2006/0227087 A1 | 10/2006 | Hajjar et al. | |
| 2007/0014318 A1 | 1/2007 | Hajjar et al. | |
| 2007/0046176 A1 | 3/2007 | Bukesov et al. | |
| 2007/0206258 A1 | 9/2007 | Malyak et al. | |
| 2007/0228927 A1 | 10/2007 | Kindler et al. | |
| 2008/0203901 A1 | 8/2008 | Bukesov et al. | |
| 2008/0247020 A1 | 10/2008 | Malyak et al. | |
| 2009/0166584 A1 | 7/2009 | Shimooka et al. | |
| 2009/0243467 A1 | 10/2009 | Shimizu et al. | |

FOREIGN PATENT DOCUMENTS

| | | |
|---|---|---|
| EP | 0884914 | 12/1998 |
| EP | 1127936 | 8/2001 |
| EP | 1150361 | 10/2001 |
| JP | 2000-180960 | 6/2000 |
| KR | 2001-085943 | 7/2002 |
| WO | WO-9941788 A9 | 11/1999 |
| WO | 00/33389 | 6/2000 |
| WO | WO-0111420 A1 | 2/2001 |
| WO | 01/24229 | 4/2001 |
| WO | 02/11173 | 2/2002 |
| WO | 2005/119797 | 12/2005 |
| WO | 2006/107720 | 10/2006 |
| WO | 2007/025973 | 3/2007 |
| WO | 2007/131195 | 11/2007 |

OTHER PUBLICATIONS

Barry, T.L., "Equilibria and Eu2+ Luminescence of Subsolidus Phases Bounded by Ba3MgSi2O8, Sr3MgSi2O8, and Ca3MgSi2O8," J. Electrochem. Soc. 115(7): 733-738 (Jul. 1968).

Barry, T.L., "Fluorescence of Eu2+-Activated Phases in Binary Alkaline Earth Orthosilicate Systems," J. Electrochem. Soc. 115(11): 1181-1184 (Nov. 1968).

Cusano, D.A., "Cathodo-, Photo-, and D.C.-Electroluminescence in Zinc Sulfide Layers," Luminescence of Organic and Inorganic Materials, Kallmann, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Dorenbos, P., "5d-level energies of Ce3+ and the crystalline environment. III. Oxides containing ionic complexes," Phys. Rev. B. 64: 125117-1-125117-12 (2001).

Dorenbos, P., "Relating the energy of the [Xe]5d configuration of Ce3+ in inorganic compounds with anion polarizability and cation electronegativity," Phys. Rev. B. 65: 235110-1-235110-6 (2002).

Greer, J.A. et al., "38.4: P-53 Thin Film Phosphors Prepared by Pulsed-Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

Huppertz, H. and W. Schnick, "Eu2Si5N8 and EuYbSi4N7. The First Nitridosilicates with a Divalent Rare Earth Metal," Acta Crystallographica, Section C., vol. 53: 1751-1753 (1997).

International Search Report and Written Opinion for PCT/US07/68286, filed May 4, 2007, published as WO 2007/131195 on Nov. 15, 2007,Southern California entitled "Phosphor Compositions for Scanning Beam Displays" (16 pages).

Jüstel, T. et al., "Novel Phosphors and Phosphor Blends for white LEDs," Philips Corporation, slides presented at the Phosphor Global Summit, Scottsdale, Arizona (Mar. 2003) (26 slides).

Kalkhoran, N.M. et al., "LP-E: Late News Poster: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

McDonald, L. W. and A. C. Lowe (Eds.), Display Systems, Design Applications, John Wiley & Sons: Chichester, England, pp. 195-196 (1997).

Mezner, L.Z. et al., "P-23: Centrifugal Settling of High Resolution 1—in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. and G.O. Mueller, "White light emitting diodes for illumination," in Light-Emitting Diodes: Research, Manufacturing, and Applications IV, H. Walter Yao et al. (Eds.), Proceeding of SPIE 3938: 30-41 (2000).

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Poort, S.H.M. et al., "Optical properties of Eu2+-activated orthosilicates and orthophosphates," Journal of Alloys and Compounds 260: 93-97 (1997).

Pringsheim, P. and M. Vogel, Luminescence of Liquids and Solids and its Practical Applications, Interscience Publishers, Inc.: New York, N.Y., pp. 144-145 (1946).

Radkov, E. et al., "White light with UV LEDs," GELcore LLC, slides presented at the Phosphor Global Summit, Scottsdale, Arizona (Mar. 2003) (19 slides).

Radkov, E. et al., "White light with UV LEDs," Third International Conference on Solid State Lighting, Ian T. Ferguson et al. (Eds.), Proceedings of the SPIE, vol. 5187, pp. 171-177 (2004).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Schlieper, T., W. Milius, and W. Schnick, "Nitrido-Silicatse. II High Temperature Syntheses and Crystal Structures of Sr2Si5N8 and Ba2Si5N8," Z. Anorg. Allg. Chem. 621:1380-1384 (1995).

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Starick, D. et al., "Silicate phosphors and their performance in white LEDs," Leuchtstoffwerk Breitungen GmbH, slides presented at the Phosphor Global Summit, Scottsdale, Arizona (Mar. 2003) (19 slides).

Tian, Yongchi, "Phosphor Development for LED Lighting Products," Sarnoff Corporation, slides presented at the Phosphor Global Summit, Scottsdale, Arizona (Mar. 2003) (19 slides).

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996.

Županc-Mežnar, L. and M. Žumer, "26.4:Preparation of P43 Suspension and Screen-Quality Evaluation in 1-in. CRTs", 1997 SID International Symposium Digest of Technical Papers ( SID '97 Digest), vol. XVIII, pp. 440-443 (May 1997).

European Search & Examination Report mailed on Jul. 25, 2012 for European Patent Application No. 12161355.8 (7 pages).

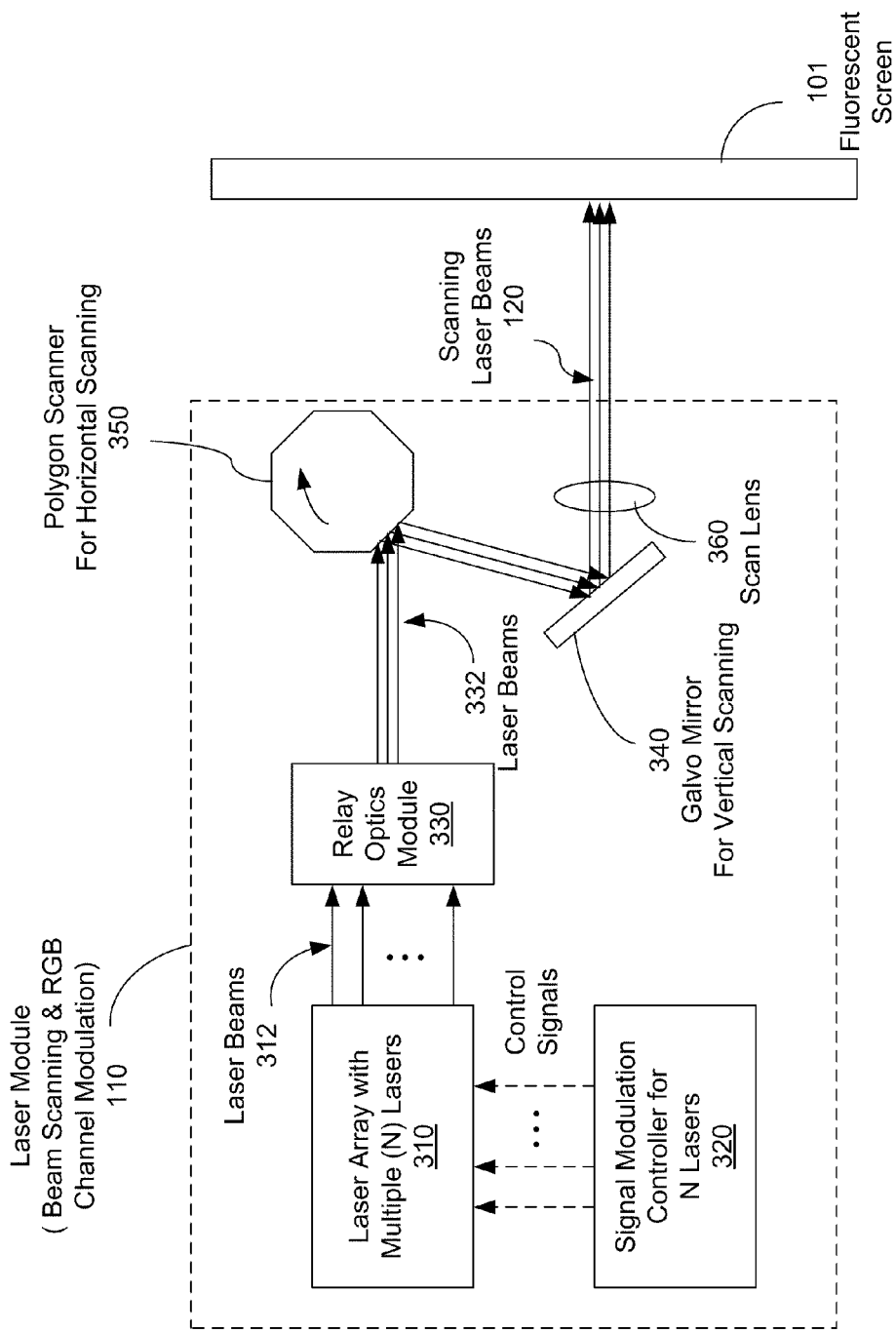

FIG. 8

| Organic fluorescent material | | | |
|---|---|---|---|
| Material | Structure | Color | Fluorescent color |
| Brilliantsulfoflavine FF (C.I. 56205) | | Yellow | Green to yellowish-green |
| Basic yellow HG (C.I. 46040) | | Yellow | Greenish-yellow to yellow |
| Eosine (C.I. 45380) | | Red | Yellow to orange |
| Rhodamine 6G (C.I. 45160) | | Red | Yellow to orange |
| Rhodamine B (C.I. 45170) | | Pink | Orange to red |

SCANNING BEAM DISPLAYS BASED ON LIGHT-EMITTING SCREENS HAVING PHOSPHORS

This application is a continuation of U.S. patent application Ser. No. 11/553,971 entitled "Scanning Beam Displays Based On Light-Emitting Screens Having Phosphors" and filed on Oct. 27, 2006 now U.S. Pat. No. 7,994,702. U.S. patent application Ser. No. 11/553,971 further claims the benefits of the following prior patent applications:

1. As a continuation-in-part of U.S. patent application Ser. No. 11/116,998 entitled "Laser Displays Using UV-Excitable Phosphors Emitting Visible Colored Light" and filed on Apr. 27, 2005 now U.S. Pat. No. 7,791,561;

2. As a continuation-in-part of U.S. patent application Ser. No. 11/335,813 entitled "Display Systems Having Screens With Optical Fluorescent Materials" and filed on Jan. 18, 2006 now U.S. Pat. No. 7,791,561;

3. As a continuation-in-part of U.S. patent application Ser. No. 11/337,170 entitled "Display Screens Having Optical Fluorescent Materials" and filed on Jan. 19, 2006 now U.S. Pat. No. 7,733,310;

4. PCT Application No. PCT/US2006/11757 entitled "Display Systems Having Screens With Optical Fluorescent Materials" and filed on Mar. 31, 2006;

5. U.S. Provisional Patent Application No. 60/798,415 entitled "Phosphor Compositions And Other Fluorescent Materials For Display Systems And Devices" and filed on May 5, 2006;

6. U.S. Provisional Patent Application No. 60/799,316 entitled "Phosphor Compositions And Other Fluorescent Materials For Display Systems And Devices" and filed on May 9, 2006;

7. As a continuation-in-part of U.S. patent application Ser. No. 11/510,495 entitled "Optical Designs for Scanning Beam Display Systems Using Fluorescent Screens" and filed on Aug. 24, 2006 now U.S. Pat. No. 8,089,425; and 8. As a continuation-in-part of U.S. application Ser. No. 11/514,720 entitled "Multilayered Fluorescent Screens for Scanning Beam Display Systems" and filed on Aug. 31, 2006 now U.S. Pat. No. 8,000,005.

This application incorporates by reference, where appropriate, the entire disclosures of the above applications as part of the specification of this application.

BACKGROUND

This application relates to display systems that use screens with fluorescent materials to emit colored light under optical excitation, such as laser-based image and video displays and screen designs for such displays.

Many image and video displays are designed to directly produce color images in different colors, such as red, green and blue and then project the color images on a screen. Such systems are often referred to as "projection displays" where the screen is simply a surface to make the color images visible to a viewer. Such projection displays may use white light sources where white beams are filtered and modulated to produce images in red, green and blue colors. Alternatively, three light sources in red, green and blue may be used to directly produce three beams in red, green and blue colors and the three beams are modulated to produce images in red, green and blue. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the color images on a screen. Another example of laser-based projection displays is described in U.S. Pat. No. 5,920,361 entitled "Methods and apparatus for image projection." Projection displays use optical lens systems to image and project the color images on the screen.

Some other image and video displays use a "direct" configuration where the screen itself includes light-producing color pixels to directly form color images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which produce light in red, green and blue, respectively, by either directly emit colored light as in LED displays and FEDs or by filtering white light such as the LCDs.

These and other displays are replacing cathode-ray tube (CRT) displays which dominated the display markets for decades since its inception. CRT displays use scanning electron beams in a vacuum tube to excite color phosphors in red, green and blue colors on the screen to emit colored light to produce color images. Although CRT displays can produce vivid colors and bright images with high resolutions, the use of cathode-ray tubes places severe technical limitations on the CRT displays and leads to dramatic decline in demand for CRT displays in recent years.

SUMMARY

This specification describes phosphor compositions used in fluorescent layers for scanning beam displays. In general, one aspect of the subject matter described in this specification can be embodied in a display device having a fluorescent layer that absorbs an excitation light at a single wavelength and emits visible light. The fluorescent layer includes a plurality of parallel fluorescent stripes. At least three adjacent fluorescent stripes are made of three different fluorescent materials, which include a first fluorescent material that absorbs the excitation light and emits light of a first color, a second fluorescent material that absorbs the excitation light and emits light of a second color, and a third fluorescent material that absorbs the excitation light and emits light of a third color.

Another aspect of the subject matter described in this specification can be embodied in a display device having a fluorescent layer that absorbs the excitation light at a single wavelength and emits white light. Optical filters are positioned relative to the fluorescent layer to receive the white light and to transmit light of different colors, respectively.

These and other embodiments can optionally include one or more of the following features. The fluorescent materials can include phosphor materials and non-phosphor materials such as organic materials. The phosphor materials can further include an Oxide-based phosphor, a Silicate-based phosphor, a Phosphate-based phosphor, a Borate-based phosphor, an Aluminate-based phosphor, a Gallate-based phosphor, a Molybdate-based phosphor, a Tungstate-based phosphor, a Fluoride-based phosphor, a Sulfide-based phosphor, and a Sulfoselenide-based phosphor. The non-phosphor organic material can include Brilliantsulfoflavine FF, Basic yellow HG, Eosine, Rhodamine 6G, and Rhodamine B.

The Oxide-based phosphor can include $(Y, Gd, La)_2O_3$:(Eu, Sm, Ce, Bi); $(Y, Gd, La)O_2S$:(Eu, Sm, Ce, Bi); (Y, Gd, La$VO_4$(Eu, Sm, Ce, Bi); $2SrO.0.84P_2O_5.0.16B_2O_3$:Eu; Sr$La_2BeO_5$:Ce; $0.82BaO.6Al_2O_3$:Eu; $1.29BaO.6Al_2O_3$:Eu; (Ca, Zn)$_2$Ge$O_4$:Mn; and (Tb$_{(1-X-Y)}$(Y, La, Gd, Sm)$_X$(Ce, Pr, Nd, Sm, Eu, Gd, Dy, Ho, Er, Tm, Yb, Lu)$_Y$)$_3$(Al, Ga, In)$_2$ $O_{12}$. The Silicate-based phosphor can include (Mg, Ba, Sr, Ca, Zn)$_2$Si$O_4$:(Eu, Ce, Mn, Ti, Pb, Sn, Li, Pr); (Mg, Ba, Sr, Ca)Si$O_4$:Eu, Ce, Mn, Ti, Pb, Sn, Li, Pr; (Mg, Ba, Sr, Ca)Si$O_5$: Eu, Ce, Mn, Ti, Pb, Sn, Li, Pr; ZrSi$O_4$:Pr; $Ca_3Sc_2Si_3O_{12}$:Ce; $Y_2SiO_5$:Tb; $Y_2Si_2O_7$:Tb; CaMgSiO:Ce; $Ca_2MgSi_2O_7$:Ce; (Ca, Sr)$_2Al_2SiO_7$:Ce; $SrAl_2Si_2O_5$:Eu; $CaMgSi_2O_5$:Eu; $SrAl_{10}SiO_{20}$:Eu; $Sr_3MgSi_2O_5$:Eu; $Sr_{1\ldots3}Mg_{0.7}SiO_4$:Eu; (Ba, Sr, Ca)$_3MgSi_2O_5$:Eu; $Y_2SiO_5$:Ce; $Sr_2Si_3O_8.2SrCl_2$:Eu; $BaSi_2O_5$:Eu; and $Sr_3MgSi_2O_7$:Eu.

The Phosphate-based phosphor can include $Zn_2(PO_4)_2$: Mn; (Mg, Ba, Ca, Sr)$_5(PO_4)_3$Cl:(Eu, Sm, Ce); and (Sr, Ca, Eu)$_{10}(PO_4)_6Cl_2.0.24B_2O_3$. The Borate-based phosphor can include (Y, Gd, La, Lu)$BO_3$:Eu, Sm, Ce, Bi; Y(Mg, Ba, Ca, Sr)$_3$(Al, Ga, In)$_3B_4O_{15}$:Eu; and $YCa_3Ga_3B_4O_{15}$:Eu. The Aluminate-based phosphor can include (Y, Gd)$_3Al_5O_{12}$:(Eu, Ce, Pr); (Mg, Ba, Ca, Sr)MgAl$_{10}O_{17}$:(Eu, Mn); (Ca, Mg, Ba, Zn)Al$_2O_4$: (Mn, Eu, Dy); (Ba, Mg, Ca, Sr)MgAl$_{14}O_{23}$:Mn, Eu; (Mg, Ba, Ca, Sr)Al$_{12}O_{19}$:Mn; and $BaMg_2Al_{16}O_{27}$:Eu, Mn. The Gallate-based phosphor can include (Y, Gd)$_3Ga_5O_{12}$:(Eu, Ce, Pr); (Ca, Mg, Ba, Zn)Ga$_2O_4$:(Mn, Eu, Dy); $ZnGa_2O_4$:Mn; and $(Li_{0.5}Ga_{0.5})_{0.5}Zn_{0.5}Ga_2O_4$.

The Molybdate-based phosphor can include (Li, K, Na, Ag)Eu$_{(1-X)}$(Y, La, Gd)$_X$Mo$_2O_5$ and (Li, K, Na, Ag)Eu$_{(1-X)}$(Y, La, Gd)$_X$Mo$_2O_8$:Sm. The Tungstate-based phosphor can include (Li, K, Na, Ag)Eu$_{(1-X)}$(Y, La, Gd)$_X$W$_2O_8$; (Li, K, Na, Ag)Eu$_{(1-X)}$(Y, La, Gd)$_X$W$_2O_8$:Sm; and $CaWO_4$:Tb, Pb. The Fluoride-based phosphor can include (KF, Mg$F_2$):Mn, Mg$F_2$: Mn, (Zn, Mg)$F_2$:Mn; $3.5MgO.0.5MgF_2.GeO_2$:Mn; and $Mg_4$(F)(Ge, Sn)$O_8$:Mn. The Sulfide-based phosphor can include (Be, Mg, Ca, Sr, Ba, Zn)S:(Eu, Ce, Cu, Ag, Al, Au, Tb, Cl, Pr, Mn, Bi); (Be, Mg, Ca, Sr, Ba, Zn) (Al, Ga, In, Y, La, Gd)$_2S_4$: (Eu, Ce, Cu, Ag, Al, Tb, Cl, Pr, Mn); (Mg, Ca, Sr, Ba)$_2$(Zn, Si, Ge, Sn)$S_3$:Eu; and (Mg, Ca, Sr, Ba) $_2$(Al, Ga, In, Y, La, Ga)$_2S_3$:Eu. The Sulfoselenide-based phosphor can include (Be, Mg, Ca, Sr, Ba, Zn)Se$_X$S$_{1-X}$:(Eu, Ce, Cu, Ag, Al, Tb, Cl, Pr, Mn) and (Be, Mg, Ca, Sr, Ba, Zn)(Al, Ga, In, Y, La, Gd)$_2$(Se$_X$S$_{1-X}$)$_4$:(Eu, Ce, Cu, Ag, Al, Tb, Cl, Pr, Mn).

The fluorescent materials can include (Mg, Ca, Sr, Ba)S: (Eu, Mn),(Mg, Ca, Sr, Ba)Se$_X$S$_{1-X}$:(Eu, Mn),(Zn, Cd)S:Ag, Cl, (Zn, Cd)S:Cu, Al, (KF, Mg$F_2$):Mn, Mg$F_2$:Mn, (Zn, Mg)$F_2$:Mn, $3.5MgO.0.5MgF_2.GeO_2$:Mn, (K, Li, Na)Eu$W_2O_8$,(Y, Gd, La)$_2O_3$: (Eu, Sm, Bi), (Y, Gd, La)$_2$O$_2$S: Eu, Sm, Bi, (Y, Gd, La)$BO_3$(Eu, Sm, Bi), (Y, Gd, La)$VO_4$: (Eu, Sm, Bi), and $CaAlSiN_3$:Eu. The fluorescent materials can also include (Mg, Ca, Sr, Ba)(Al, Ga, In, Y, La, Gd)$_2S_4$: (Eu, Mn), (Mg, Ca, Sr, Ba)(Al, Ga, In, Y, La, Gd)$_2$(Se$_X$ S$_{1-X}$) $_4$:(Eu, Mn), and (Ba, Sr, Ca)Si$O_4$:(Eu, Mn). The fluorescent materials can further include (Ba, Mg, Sr)Al$_{10}O_{17}$: (Eu, Mn) and (Sr, Ca, Ba, Mg)$_{10}(PO_4)_6C_{12}$:Eu.

The fluorescent layer can include a first optical absorbent material mixed in the first fluorescent material that absorbs light of the second and third colors and transmits light of the first color; a second optical absorbent material mixed in the second fluorescent material that absorbs light of the first and third colors and transmits light of the second color; and a third optical absorbent material mixed in the third fluorescent material that absorbs light of the first and second colors and transmits light of the third color. The first optical absorbent material, the second optical absorbent material, and the third optical absorbent material can substantially transmit the excitation light. The excitation light can be at an ultra violet wavelength. The excitation light can also be at a violet wavelength. The excitation light can further be at a wavelength less than about 420 nanometers.

The fluorescent layer can include $8SrCO_3.4CaCO_3.11Al_2O_3.0.18Eu_2O_3$; $3Ca_3(PO_4)_2.Ca(F, Cl)_2$:Sb; $3Ca_3(PO_4)_2.Ca(F, Cl)_2$:Sb, Mn; $3Ca_3(PO_4)_2.Ca(F, Cl)_2$:Sb; $BaO.TiO_2P_2O5$; and $MgWO4$. The fluorescent layer can further include a mixture of ZnS:Ag with either (Zn, Cd)S:Cu, Al; ZnS:Cu, Al; or a combination of $Zn_2SiO_4$:Mn and (Zn, Mg)$_3(PO_4)_2$:Mn.

These and other examples and implementations are described in detail in the drawings, the detailed description and the claims.

BRIEF DESCRIPTION OF THE DRAWINGS

FIGS. 4A and 4B show scanning beam displays using fluorescent screens where a polygon scanner is positioned upstream from a galvo mirror along the propagation direction of an excitation beam.

FIG. 8 shows a table of representative non-phosphor organic material useful as fluorescent material.

DETAILED DESCRIPTION

Figure 1:
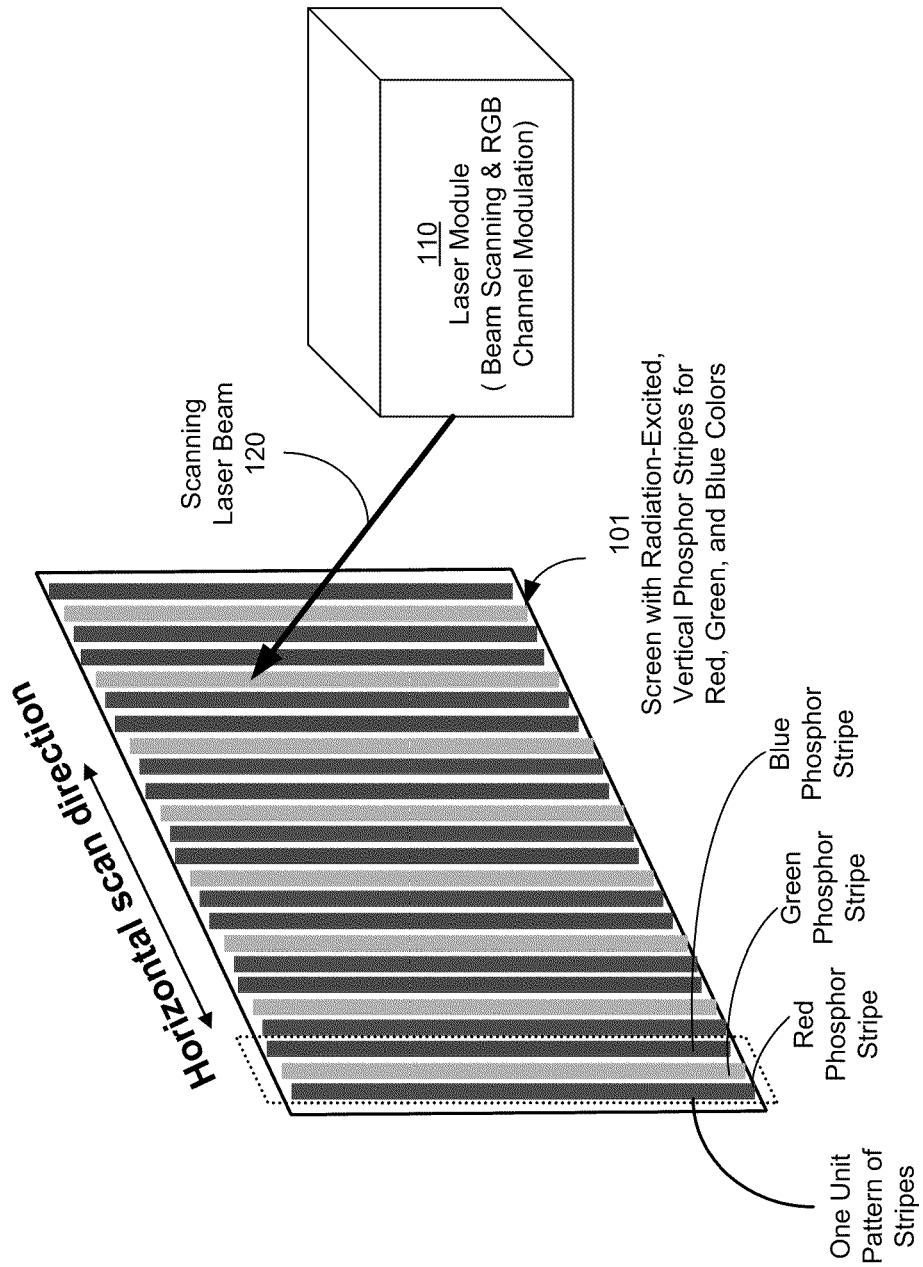
FIG. 1 shows an example scanning laser display system having a fluorescent screen made of laser-excitable phosphors emitting colored lights under excitation of a scanning laser beam that carries the image information to be displayed.

This application describes scanning beam display systems that use screens with fluorescent materials to emit light under optical excitation to produce images, including laser video display systems. Various examples of screen designs with fluorescent materials are described. Screens with phosphor materials under excitation of one or more scanning excitation laser beams are described in detail and are used as specific implementation examples of optically excited fluorescent materials in various system and device examples in this application.

In one implementation, for example, three different color phosphors that are optically excitable by the laser beam to respectively produce light in red, green, and blue colors suitable for forming color images may be formed on the screen as pixel dots or periodic red, green and blue phosphor stripes in parallel. Various examples described in this application use screens with parallel color phosphor stripes for emitting light in red, green, and blue to illustrate various features of the laser-based displays.

Phosphor materials are one type of fluorescent materials. Various described systems, devices and features in the examples that use phosphors as the fluorescent materials are applicable to displays with screens made of other optically excitable, light-emitting, non-phosphor organic fluorescent materials.

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Figure 2A:
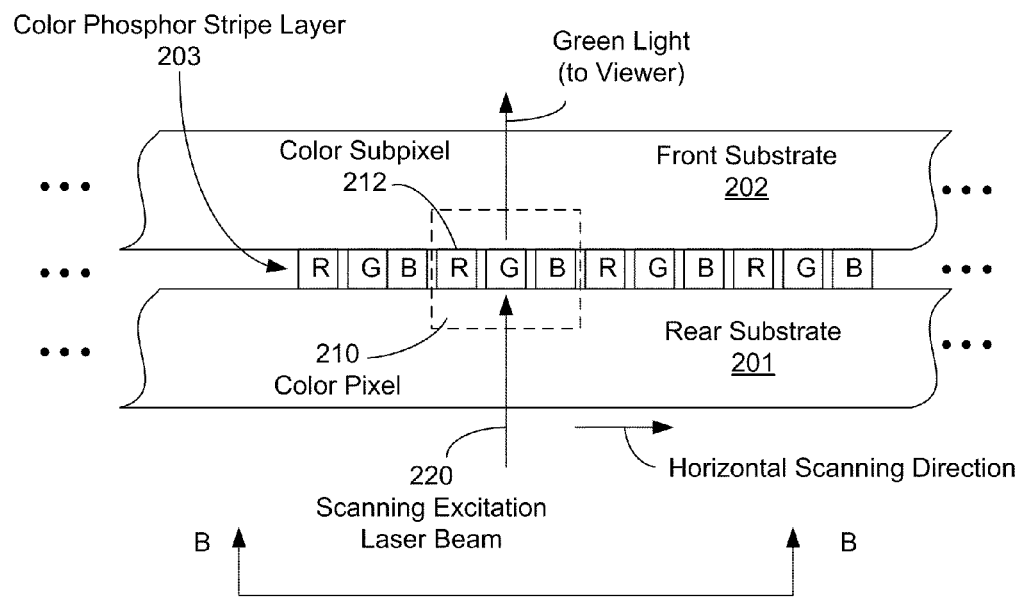
FIGS. 2A and 2B show one example screen structure and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
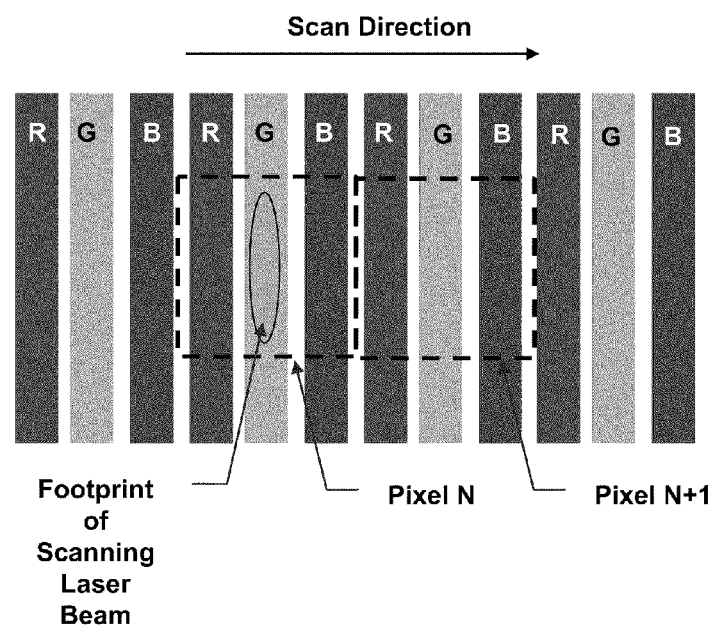

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Each of the fluorescent stripes in the fluorescent screen 101 in various examples described in this application is a fluorescent stripe that emits a designated color under optical excitation and can be a fluorescent stripe formed of a particular fluorescent material that emits the designed color as shown in the example in FIG. 2A. Alternatively, a fluorescent stripe can be constructed by a combination of a stripe color filter over a contiguous and uniform white fluorescent layer that is made of mixed phosphors that emit white light under optical excitation of the excitation light 120. Hence, a filter layer of color filters, such as stripes of red-transmitting, green-transmitting and blue-transmitting filters, is placed on the viewer side of the mixed phosphor layer to filter the white light and to produce colored output light. The details of the construction of the fluorescent stripes are described in a later section of this specification with reference to FIG. 7. In this context, a fluorescent layer has a composite structure with a filter layer and a contiguous fluorescent layer that emits white light.

Figure 3:
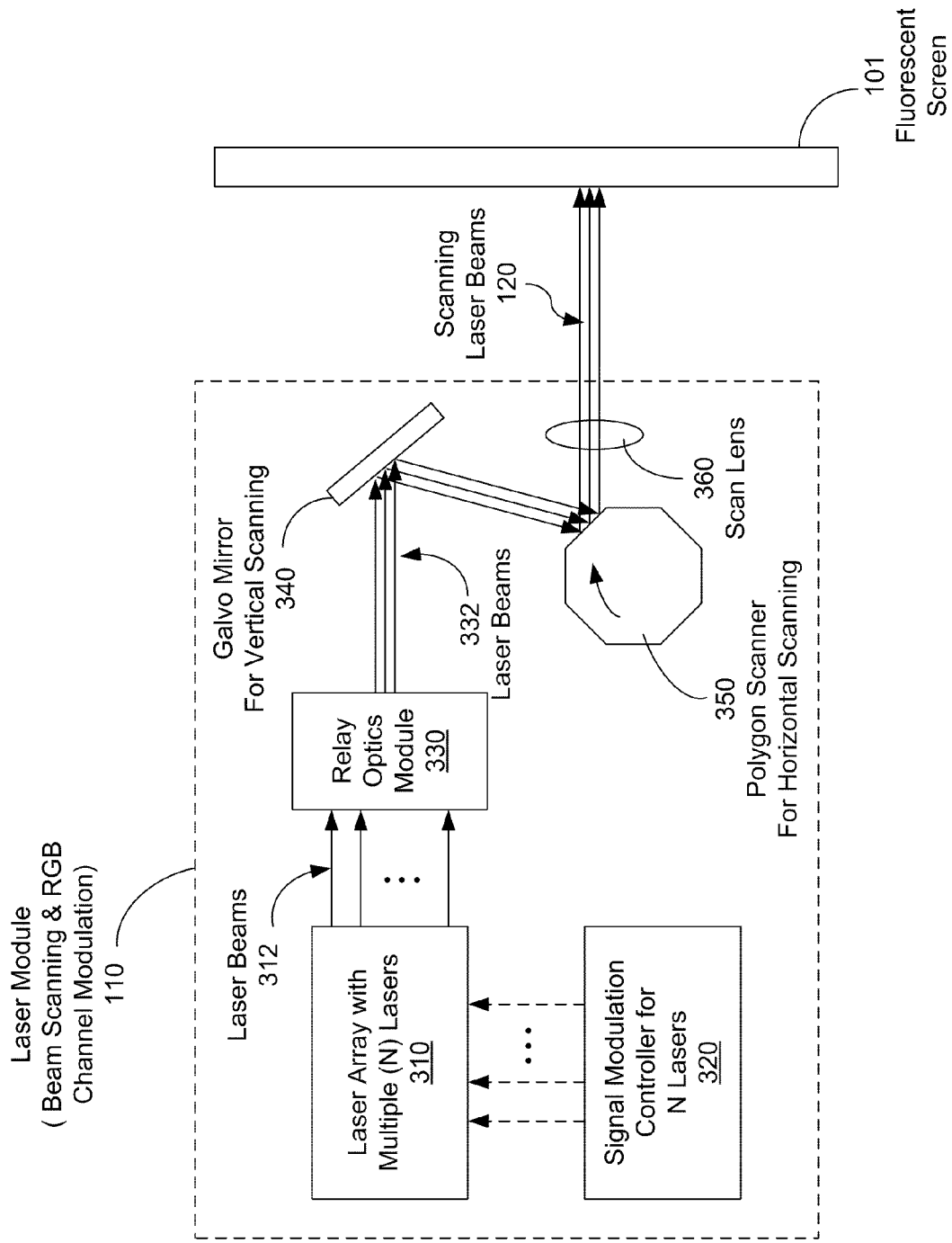
FIG. 3 shows an example implementation of the laser module in FIG. 1 having multiple lasers that direct multiple laser beams on the screen.

Referring now to FIG. 3, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

The stripe design in FIG. 2B for the fluorescent screen 101 in FIGS. 1 and 3 can be implemented in various configurations. FIG. 2A shows one example which places the fluorescent layer 203 such as a color phosphor stripe layer between two substrates 201 and 202. In a rear projection system, it is desirable that the screen 101 couple as much light as possible in the incident scanning excitation beam 120 into the fluorescent layer with while maximizing the amount of the emitted light from the fluorescent layer that is directed towards the viewer side. A number of screen mechanisms can be implemented, either individually or in combination, in the screen 101 to enhance the screen performance, including efficient collection of the excitation light, maximization of fluorescent light directed towards the viewer side, enhancement of the screen contrast and reduction the screen glare. The structure and materials of the screen 101 can be designed and selected to meet constraints on cost and other requirements for specific applications.

Figure 4B:
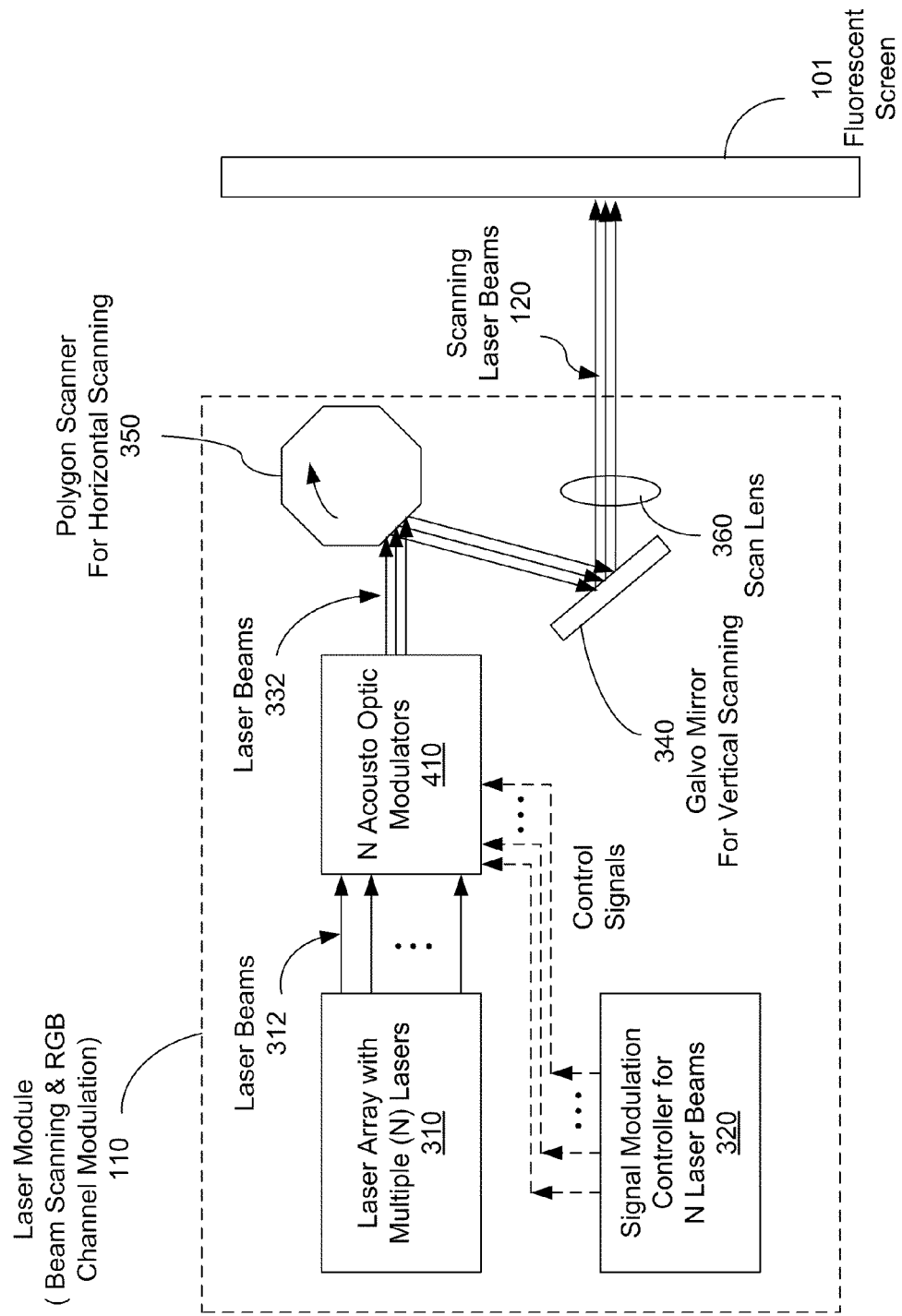

In FIG. 3, the beam scanning is achieved by using the galvo mirror 340 for vertical scanning to direct an excitation beam to the polygon scanner 350 which in turn directs the excitation beam onto the screen 101. Alternatively, the polygon scanner 350 can be used to scan the excitation beam onto the galvo mirror 350 which further directs the beam to the screen 101. FIGS. 4A and 4B show two examples of such scanning beam display systems in which the order of the polygon scanner 350 and the galvo mirror 340 is reversed from the order in FIG. 3. The display in FIG. 4B uses N acousto optic modulators 410 to respectively modulate N continuous-wave (CW) excitation laser beams 312 from the laser array 310 to produce modulated laser beams 332 which carry image data. Other optical modulators may also be used to replace the acousto optic modulators 410.

Figure 5:
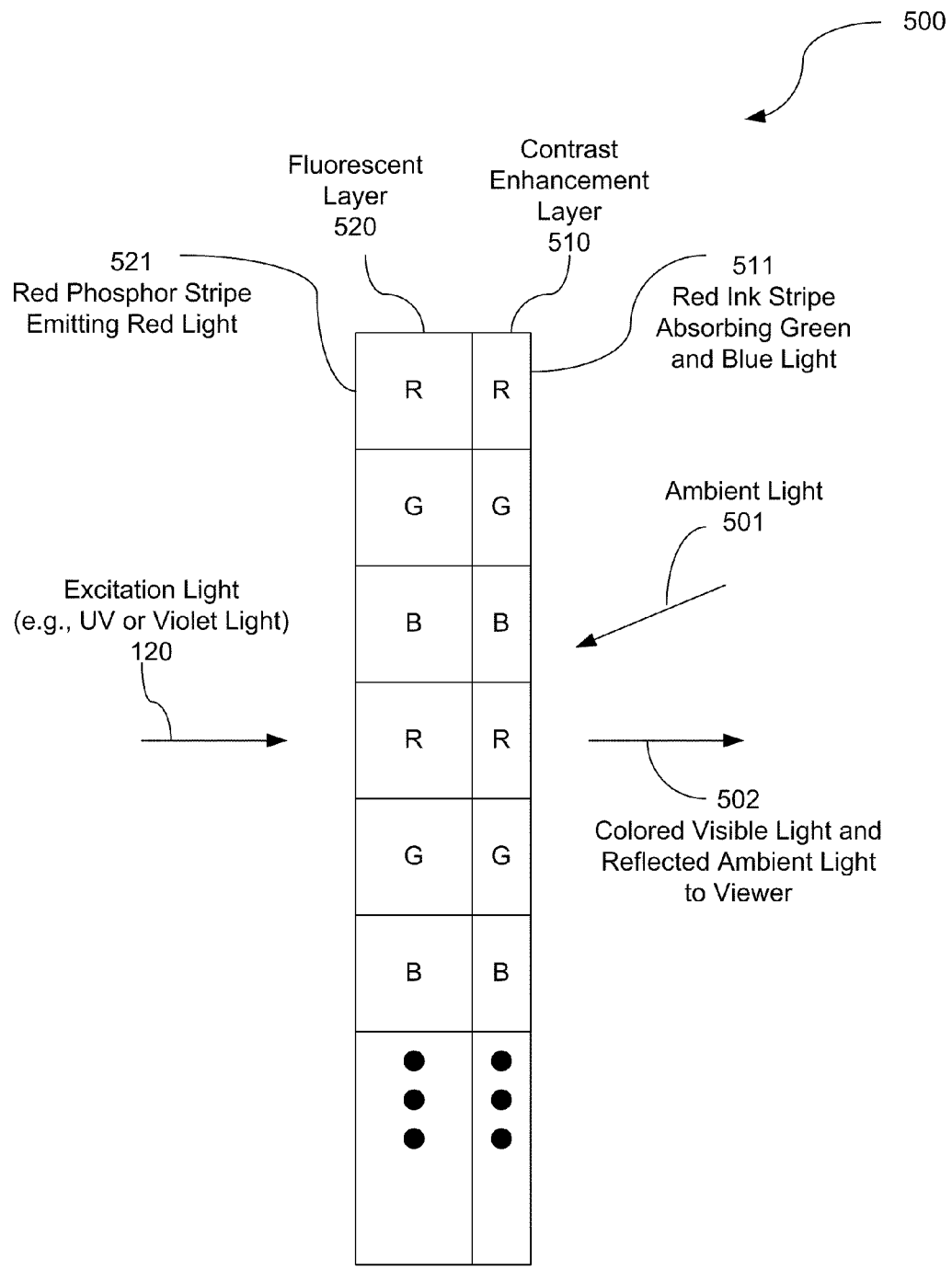
FIG. 5 shows a fluorescent screen design with a contrast enhancement layer.

FIG. 5 shows one example of a screen 500 that uses a contrast enhancement layer 510 on the viewer side of the fluorescent layer 520. The fluorescent layer 520 includes parallel phosphor stripes. Accordingly, the contrast enhancement layer 510 also includes matching parallel stripes made of different materials. For a red phosphor stripe 521 that emits red light in response to excitation by the excitation light (e.g., UV or violet light), the matching stripe 511 in the contrast enhancement layer 510 is made of a "red" material that transmits in a red spectral band covering the red light emitted by the red phosphor stripe 521 and absorbs or otherwise blocks other visible light including the green and blue light. Similarly, for a green phosphor stripe that emits green light in response to excitation by UV light, the matching stripe in the contrast enhancement layer 510 is made of a "green" material that transmits in a green spectral band covering the green light emitted by the green phosphor and absorbs or otherwise blocks other visible light including the red and blue light. For a blue phosphor stripe that emits blue light in response to excitation by UV light, the matching stripe in the contrast enhancement layer 510 is made of a "blue" material that transmits in a blue spectral band covering the blue light emitted by the blue phosphor and absorbs or otherwise blocks other visible light including the green and red light. These matching parallel stripes in the contrast enhancement layer 510 are labeled as "R," "G" and "B," respectively.

In this example, the contrast enhancement layer 510 includes different stripe filtering regions that spatially align with and match respective fluorescent regions along the direction perpendicular to the screen. Each filtering region transmits light of a color that is emitted by a corresponding matching fluorescent region and blocks light of other colors. Different filtering regions in the layer 510 may be made of materials that absorb light of other colors different from the colors emitted by the respective matching fluorescent regions. Examples of suitable materials include dye-based colorants and pigment-based colorants. In addition, each filtering region in the contrast enhancement layer 510 can be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films" describe examples of red, green and blue filters that may be used in the layer 510 in the screen 500 in FIG. 5.

In operation, the excitation light 120 (e.g., UV light) enters the fluorescent layer 520 to excite different phosphors to emit visible light of different colors. The emitted visible light transmits through the contrast enhancement layer 510 to reach the viewer. The ambient light 501 incident to the screen 800 enters the contrast enhancement layer 510 and a portion of the incident ambient light 501 is reflected towards the viewer by passing through the contrast enhancement layer 510 for the second time. Therefore, the total optical output 502 towards the viewer includes image-carrying colored visible light emitted by the phosphor layer 520 and the reflected ambient light. This reflected ambient light does not carry image and thus tends to wash out the image produced at the phosphor layer 520. Because this reflected ambient light towards the viewer has passed the contrast enhancement layer 510 twice and thus has been filtered and attenuated twice, the intensity of the reflected ambient light is reduced by approximately two thirds of that of the received ambient light. As an example, the green and blue portions of the incident ambient light 501 comprise approximately two thirds of the flux of the ambient light 501 entering a red subpixel. The green and blue portions of the incident ambient light 501 are blocked by the contrast enhancement layer 510. Only the red portion of the ambient light within the transmission band of the red filter material in the contrast enhancement layer 510 transmits through the layer 510 and a part of the transmitted red ambient light is reflected back to the viewer. This part of the reflected ambient light is essentially the same color for the subpixel generated by the underlying color phosphor stripe and thus the color contrast is not adversely affected.

The above use of a color-selective absorbent material in the contrast enhancement layer 510 for each subpixel to enhance the display contrast can also be implemented by mixing such a material with the light-emitting fluorescent material in each subpixel without a separate contrast enhancement layer. In one implementation, each phosphor region in the fluorescent layer design can be formed of a mixture of a fluorescent material and a color-selective absorbent material that transmits light emitted by the fluorescent material and absorbs light of other colors. Hence, the contrast enhancing feature is built into each subpixel to reduce the reflected ambient light to the viewer.

Figure 6A:
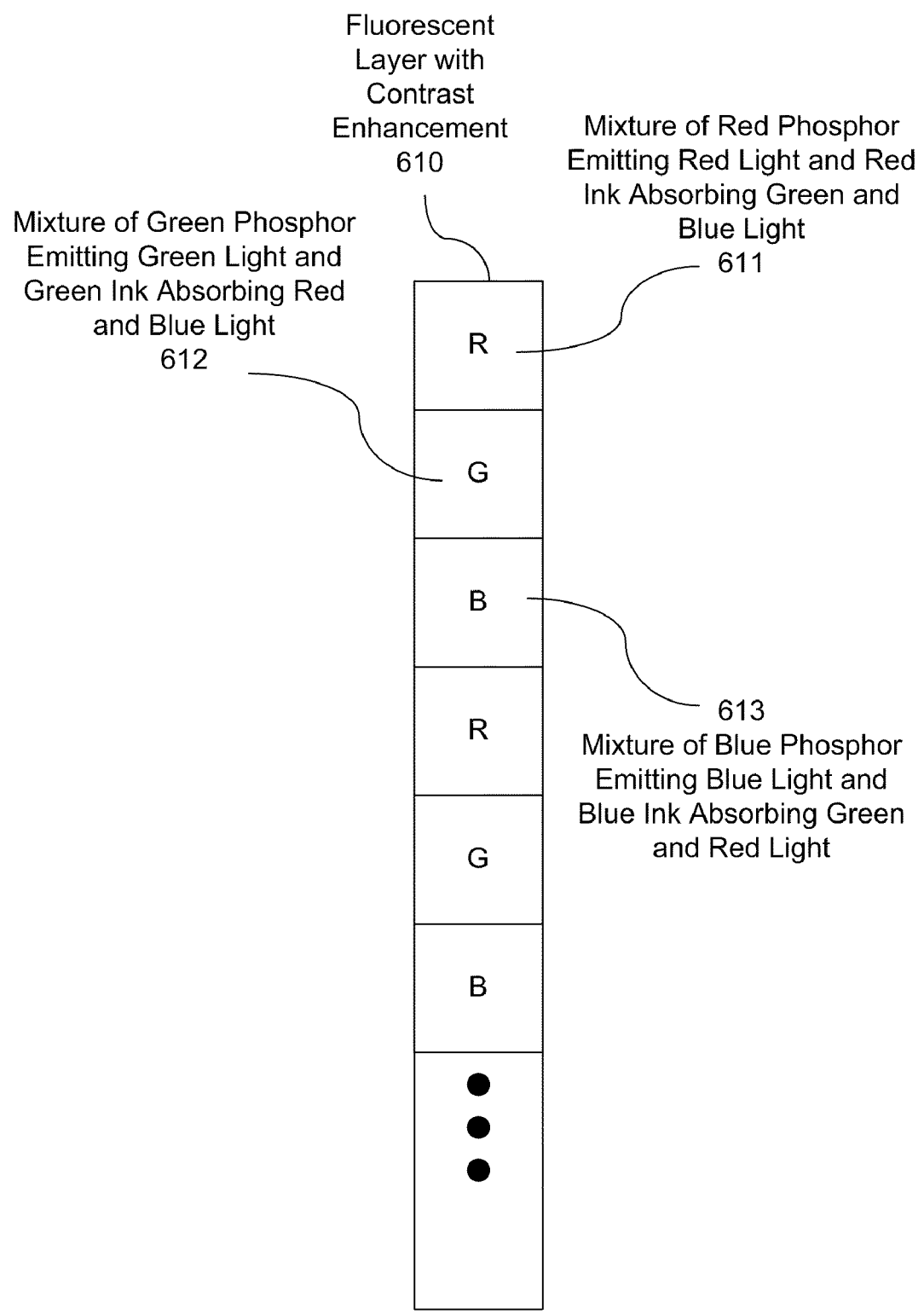
FIG. 6A shows a fluorescent screen design with a contrast enhancement material composition in each fluorescent stripe.
Figure 6B:
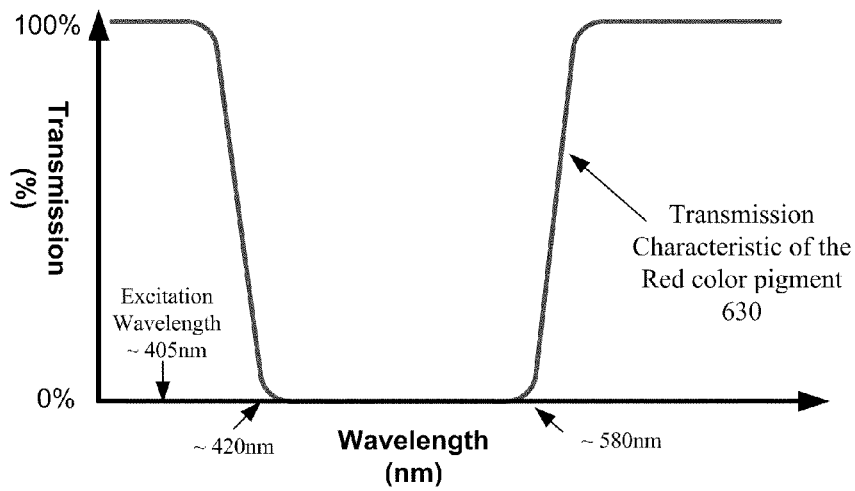
FIG. 6B-D show the transmission characteristics for Red, Green, and Blue color pigments used as the contrast enhancement material in FIG. 6A.

FIG. 6A shows another implementation that uses red, green, and blue phosphor materials with built-in contrast-enhancing capability for emitting red, green and blue light, respectively, in a common fluorescent layer 610 of parallel fluorescent stripes. Consider three consecutive red, green and blue phosphor stripes 611, 612 and 613. The material for the red phosphor stripe 611 is a mixture of a red phosphor capable of emitting red light and a red ink or pigment which transmits the red light and absorbs other light including the green and blue light. Additionally, the red ink or pigment can have a transmission characteristic 630 as shown in FIG. 6B. Since the red ink or pigment is mixed with the red phosphor, one of the notable characteristics is that the red ink or pigment substantially transmits (~100%) below the wavelength of around 420 nm in order to prevent absorbing the excitation light. Furthermore, the red ink or pigment can substantially transmit at a wavelength above around 580 nm to allow for the emitted red color from the red phosphors.

Figure 6C:
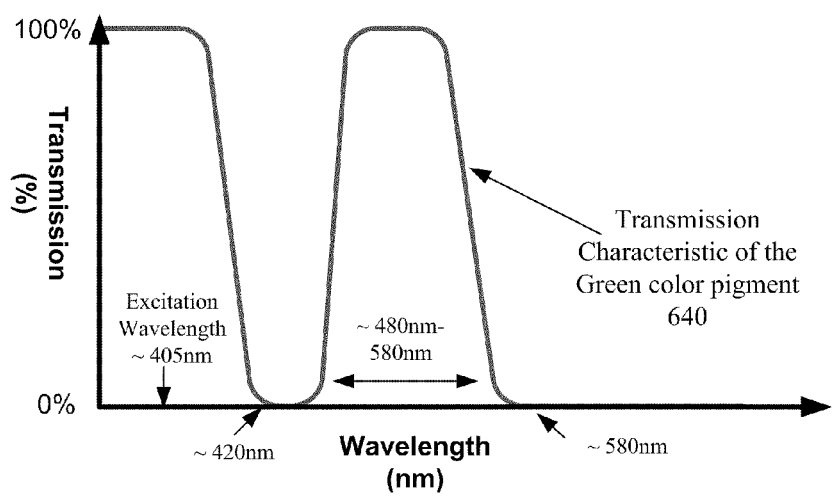

The material for the green phosphor stripe 612 is a mixture of a green phosphor emitting green light and a green ink or pigment which transmits the green light and absorbs other light including the red and blue light. Additionally, the green ink or pigment can have a transmission characteristic 640 as shown in FIG. 6C. Since the green ink or pigment is mixed with the green phosphor, one of the notable characteristics is that the green ink or pigment substantially transmits (~100%) below the wavelength of around 420 nm in order to prevent absorbing the excitation light. Furthermore, the green ink or pigment can substantially transmit at a wavelength window of above around 480 nm and below about 580 nm to allow for the emitted green color from the green phosphors.

Figure 6D:
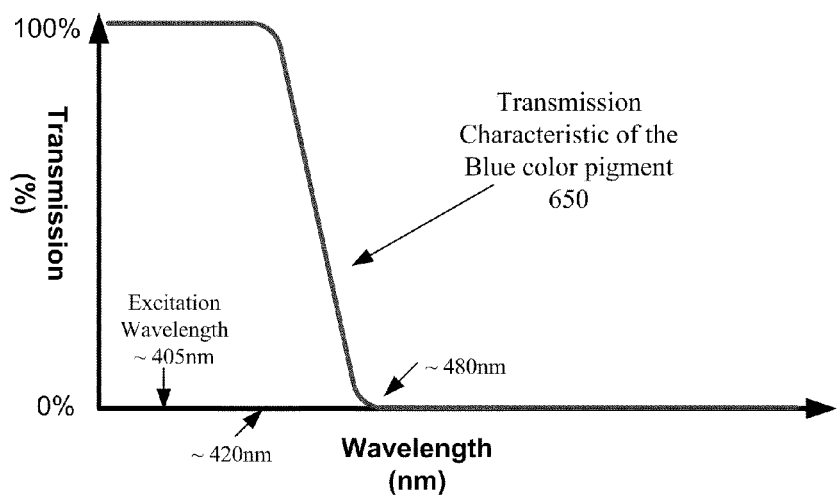

The material for the blue phosphor stripe 613 is a mixture of a blue phosphor emitting blue light and a blue ink or pigment which transmits the blue light and absorbs other light including the red and green light. Additionally, the blue ink or pigment can have a transmission characteristic 650 as shown in FIG. 6D. Since the blue ink or pigment is mixed with the blue phosphor, one of the notable characteristics is that the blue ink or pigment substantially transmits (~100%) below the wavelength of around 480 nm in order to prevent absorbing the excitation light (below ~420 nm) and to allow for the emitted blue color from the blue phosphors.

The contrast-enhancing fluorescent layer 610 can be combined with various screen designs and configurations described in this application.

The above described fluorescent screens use different phosphor materials in different fluorescent stripes to produce different colors under excitation of the excitation light. Alternatively, different fluorescent stripes can be formed by the same fluorescent material that emits white light and can further include color filters to produce desired different colors from the fluorescent light. The contrast enhancement layer 510 in FIG. 5 can be used to implement such color filters so that each color filter achieves both contrast enhancement and generation of a designated subpixel color.

Figure 7:
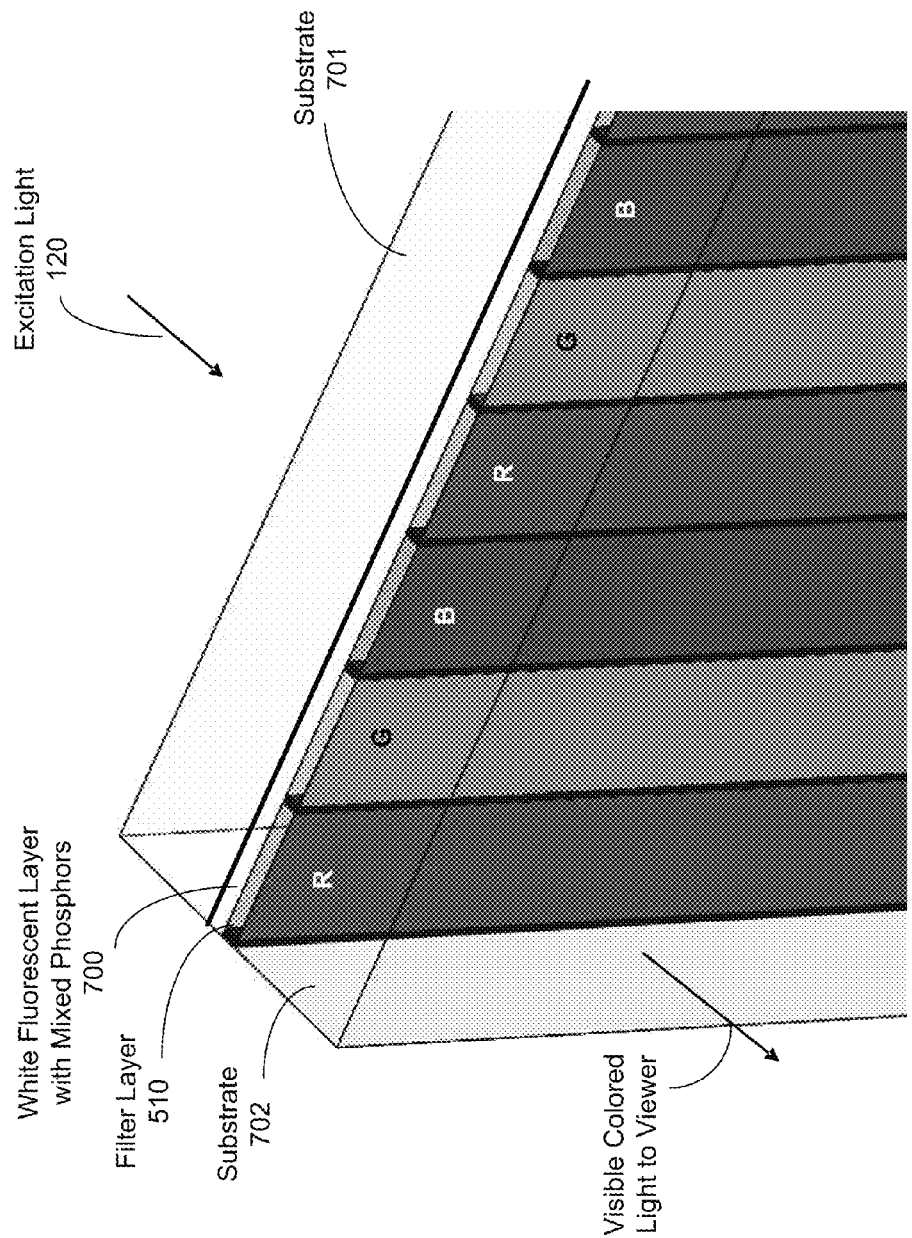
FIG. 7 illustrates an example of a fluorescent screen design that has a contiguous and uniform layer of mixed phosphors that emits white light.

FIG. 7 illustrates an example of a fluorescent screen design that has a contiguous and uniform layer 700 of mixed phosphors. This mixed phosphor layer 700 is designed and constructed to emit white light under optical excitation of excitation light. The mixed phosphors in the mixed phosphor layer 700 can be designed in various ways and a number of compositions for the mixed phosphors that emit white light are known and documented. Other non-phosphor fluorescent materials that emit white light can also be used for the layer 700. As illustrated, a layer 510 of color filters, such as stripes of red-transmitting, green-transmitting and blue-transmitting filters, is placed on the viewer side of the mixed phosphor layer 700 to filter the white light and to produce colored output towards the viewer. In this example, the layers 700 and 510 are sandwiched between substrates 701 and 702. The color filters in the layer 510 may be implemented in various configurations, including in designs similar to the color filters used in color LCD panels. In each color filter region e.g., a red-transmitting filter, the filter transmits the red light and absorbs light of other colors including green light and blue light.

The screen structure in FIG. 7 is simpler than other screen designs with different fluorescent stripes because the mixed phosphor layer 700 in FIG. 7 is a contiguous layer without striped spatial structures. This construction avoids alignment issues associated with aligning the filters in layer 510 with respective fluorescent stripes in the layer 520 in FIG. 5. The substrate 701 receives the excitation light and thus can be made of a material transparent to the excitation light, e.g., violet or UV light. The substrate 702 faces the viewer and can be made of a material transparent to the colored light filtered by the filters in the layer 510. In fabrication, the layer 510 can be fabricated on the substrate 702 and the layer 700 can be fabricated on the substrate 701. The two substrates 701 and 702 can be engaged to each other to form the screen. At the output surface of the second substrate 702, an anti-reflection coating (AR) may be formed to improve the light transmission to the viewer. In addition, a hard protection layer may be formed over the second substrate 702 to protect the screen surface.

UV-excitable non-phosphor organic material suitable of color or monochromatic screens described in this application may be implemented with various material compositions. FIG. 8 shows a table of representative organic materials, along with their chemical structures, colors, and fluorescent colors. The exemplary organic material are Brilliantsulfoflavine FF, Basic yellow HG, Eosine, Rhodamine 6G, and Rhodamine B. In general, any organic material capable of absorbing excitation light such as UV light and emitting photons in the visible range at wavelengths longer than the excitation light wavelength can be used.

UV-excitable phosphors suitable of color or monochromatic screens described in this application may be implemented with various material compositions. Typically, such phosphors absorb excitation light such as UV light to emit photons in the visible range at wavelengths longer than the excitation light wavelength. For example, red, green, and blue fluorescent materials may be ZnCdS:Ag, ZnS:Cu, and ZnS:Ag, respectively.

TABLE 1

Examples of Phosphors

| Patent Publications # | Phosphor System(s) |
|---|---|
| WO 02/11173 A1 | MS:Eu; M = Ca, Sr, Ba, Mg, Zn<br>M*N*$_2$S$_4$:Eu, Ce; M* = Ca, Sr, Ba, Mg, Zn; N* = Al, Ga, In, Y, La, Gd |
| US6417019B1 | (Sr$_{1-u-v-x}$Mg$_u$Ca$_v$Ba$_x$)(Ga$_{2-y-z}$Al$_y$In$_z$S$_4$):Eu$^{2+}$ |
| US2002/0185965 | YAG:Gd, Ce, Pr, SrS, SrGa$_2$S$_4$ |
| WO 01/24229 A2 | CaS:Eu$^{2+}$/Ce$^{3+}$, SrS: Eu$^{2+}$/Ce$^{3+}$<br>SrGa$_2$S$_4$:Eu$^{2+}$/Ce$^{3+}$ |
| US Application 20040263074 | SrS:Eu$^{2+}$; CaS:Eu$^{2+}$; CaS:Eu$^{2+}$, Mn$^{2+}$; (Zn,Cd)S:Ag$^+$;<br>Mg$_4$GeO$_{5.5}$F:Mn$^{4+}$; ZnS:Mn$^{2+}$. |
| WO 00/33389 | Ba$_2$MgSi$_2$O$_7$:Eu$^{2+}$; Ba$_2$SiO$_4$:Eu$^{2+}$; (Sr,Ca,Ba)(Al,Ga)$_2$S$_4$:Eu$^{2+}$ |
| US20010050371 | (Li, K, Na, Ag)Eu$_{(1-x)}$(Y, La, Gd;)$_x$(W,Mo)$_2$O$_8$; Y$_x$Gd$_{3-x}$Al$_5$O$_{12}$:Ce |
| US6252254 B1 | YBO$_3$:Ce$^{3+}$, Tb$^{3+}$; BaMgAl$_{10}$O$_{17}$:Eu$^{2+}$, Mn$^{2+}$;<br>(Sr,Ca,Ba)(Al,Ga)$_2$S$_4$:Eu$^{2+}$; Y$_3$Al$_5$O$_{12}$:Ce$^{3+}$<br>Y$_2$O$_2$S:Eu$^{3+}$, Bi$^{3+}$; YVO$_4$:Eu$^{3+}$, Bi$^{3+}$; SrS:Eu$^{2+}$; SrY$_2$S$_4$:Eu$^{2+}$;<br>CaLa$_2$S$_4$:Ce$^{3+}$; (CaSr)S:Eu$^{2+}$ |
| US2002/0003233 | Y—Al—O; (Y,Ln)—Al—O; (Y,Ln)—(Al,Ga)—O<br>SrGa$_2$S$_4$; SrS<br>M—Si—N<br>[Ce,Pr,Ho,Yb,Eu] |
| EP 1150361 A1 | (Sr,Ca,Ba)S:Eu$^{2+}$ (SrS:Eu$^{2+}$) |
| US 20020145685 | Display device using blue LED and red, green phosphors<br>SrS:Eu$^{2+}$ and SrGa$_2$S$_4$:Eu$^{2+}$ |
| US 20050001225 | (Li,Ca,Mg,Y)$_x$Si$_{12-(m+n)}$Al$_{(m+n)}$O$_n$N$_{16-n}$: Ce, P, Eu, Tb, Yb, Er, Dy |
| U.S. Pat. No. 5,998,925 | (Y, Lu, Se, La, Gd, Sm)(Al, Ga)O:Ce |
| U.S. Pat. No. 6,765,237 | BaMg$_2$Al$_{16}$O$_{27}$:Eu$^{2+}$(BAM) and (Tb$_{(1-x-y)}$(Y, La, Gd, Sm)$_x$ (Ce, Pr, Nd, Sm, Eu, Gd, Dy, Ho, Er, Tm, Yb, Lu)$_y$)$_3$(Al, Ga, In)$_z$O$_{12}$ (TAG) |
| US Application 20040227465 | Sr$_x$Ba$_y$Ca$_z$SiO$_4$:Eu$^{2+}$, Ce, Mn, Ti, Pb, Sn |
| US Application 20050023962 | ZnSe(x)S(1 − x):(Cu, Ag, Al, Ce, Tb, Cl, I, Mg, Mn) |
| US Application 20050023963 | (Be, Mg, Ca, Sr, Ba, Zn)(Al, Ga, In, Y, La, and Gd)$_2$(S$_x$Se$_y$)$_4$:Eu, Ce, Cu, Ag, Al, Tb, Cl, Br, F, I, Mg, Pr, K, Na, Mn |

TABLE 1 lists some examples of phosphors that emit visible color light when excited by excitation light in the wavelength range from 380 nm to 415 nm described in various published patent documents. Various phosphors listed in TABLE 1 can also be excited by light from 450 nm to 470 nm. These and other phosphors can be used to implement the phosphor-based laser displays described in this application.

The examples of phosphors described in the published PCT application No. WO 02/11173 A1 are "Type I" phosphors with compositions of Eu-doped photoluminescent metal sulfides in form of MS:Eu where M is at least one of Ca, Sr, Ba, Mg and Zn, and "Type II" phosphors with compositions of metal thiometallate photoluminescent materials in form of M*N*$_2$S$_4$:Eu, Ce where M* is at least one of Ca, Sr, Ba, Mg and Zn, and N* is at least one of Al, Ga, In, Y, La and Gd. A photoluminescent metal sulfide MS (Type I phosphor) may include at least one of Ba, Mg, and Zn alone or in combination with at least one of Sr and Ca. A metal thiometallate photoluminescent material $M^*N^*_2S_4$ (type II phosphor) may include at least one element selected from the group $M^*$=Mg and Zn alone for $M^*$ or in combination with at least one of Ba, Sr and Ca and the element $N^*$ may be Al or Ga alone or in further combination with In, Y, La, Gd. A metal thiometallate photoluminescent material may be activated with at least one of europium (Eu) and cerium (Ce). Two or more of type I and type II phosphors may be combined, or one or more phosphors of type I and type II phosphors may be combined with other phosphors different from phosphors of type I and type II to form a phosphor blend to generate a color that may not be available from individual type I and type II phosphors.

Specific examples of the phosphor compositions for the type I phosphors for emitting red colors include $(Sr_{1-x-y}M_x$-$Eu_y)S$ with M is at least one of Ba, Mg, Zn alone or in combination with Ca and $0<x\leqq=0.5$ and $0<y\leqq=0.10$, $(Sr_{1-x-y}Ba_xEu_y)S$ with $x\leqq 0.25$, $(Sr_{1-x-z-y}Ca_xBa_zEu_y)S$ with $x+y+z\leqq=0.35$ which exhibit a high quantum efficiency of 65-80%, high absorbance in the range from 370 nm to 470 nm of 60-80% and low loss, below 10%, of the luminescent lumen output from room temperature to 100° C. due to thermal quenching. Specific examples of type II phosphor compositions are $M^*N^*_2S_4$:Eu, Ce (type II phosphor) where $M^*$ is at least one of $M^*$=Mg, Zn alone or together with at least one of Ba, Sr, Ca, and $N^*$ is at least one of $N^*$=Al, Ga, alone or together with small amounts (below 20%) of In, Y, La, Gd. Such type II phosphors emit light in the blue, green or green-yellow spectral range of the visible spectrum. Specific compositions for the type II phosphors include $(M^{**}_{1-u}Mg_u)(Ga_{1-v}N^*_v)_2S_4$:Ce with $u\leqq 0.75$ and $v\leqq 0.10$, and $M^{}$ is at least one of $M^{}$=Ba, Sr, Ca, Zn, $(M^{**}_{1-s-t}Eu_sCe_t)(Ga_{1-v}N^*_v)_2 S_4$ with $M^{**}$ is at least one of =Mg, Zn alone or in combination with Sr, Ba, Ca, and $N^*$=Al, In, Y, La, Gd and $0<s\leqq=0.10$ and $0\leqq t:s<0.2$ with $v\leqq 0.10$, $((Ba_{1-u}Mg_u)_{1-s-t}Eu_sCe_t)(Ga_{1-v}N^*_v)_2S_4$ with $u\leqq 0.75$ and $v\leqq 0.10$ and $0<s\leqq 0.10$ and $0s\leqq t:s<0.2$, $(((Ba_{1-w}Ca_w)_{1-u}Mg_u)_{1-s-t}Eu_sCe_t)(Ga_{1-v}N^*_v)_2S_4$ with $u<0.75$ and $w\geqq 0.10$ and $v<0.10$ and $0\leqq s<0.10$ and $0\leqq t:s<0.2$, $(((Ba_{1-r}Sr_r)_{1-u}Mg_u)_{1-s-t}Eu_sCe_t)(Ga_{1-v}N^*_v)_2S_4$ with $u<0.75$ and $r\geqq 0.10$ and $v\leqq 0.10$ and $0<s\leqq 0.10$ and $0\leqq t:s<0.2$, $(((Sr_{1-w}Ca_w)_{1-u}Mg_u)_{1-s-t}Eu_sCe_t)(Ga_{1-v}N^*_v)_2S_4$ with $u\leqq 0.75$ and $w\geqq 0.10$ and $v\leqq 0.10$ and $0<s\leqq 0.10$ and $t:s<0.2$, and $(((Sr_{1-p}Zn_p)_{1-u}Mg_u)_{1-s-t}Eu_sCe_t)(Ga_{1-v}N^*_v)_2S_4$ with $u<0.75$ and $p\leqq 0.35$ and $v<0.10$ and $0<s<0.10$ and $0<t:s<0.2$.

The examples of phosphors described in U.S. Pat. No. 6,417,019 include $(Sr_{1-u-v-x}Mg_uCa_vBa_x)(Ga_{2-y-z}AlIn_zS_4)$:$Eu^{2+}$, $(Sr_{1-u-v-x}Mg_uCa_vBa_x)(Ga_{2-y-z} Al_yIn_zS_4)$:$Eu^{2+}$. The phosphor particles may be dispersed in a host material which is selected from, for example, materials including but not limited to epoxies, acrylic polymers, polycarbonates, silicone polymers, optical glasses, and chalcogenide glasses. Alternatively, such phosphors may be deposited on substrate surfaces as phosphor films.

The examples of phosphors described in U.S. Patent Application Publication No. 2002/0185965 include the phosphor powder mixed with the conventional curable silicone composition is a powder of $(Y, Gd)_3Al_5O_{12}$:Ce (gadolinium and cerium doped yttrium aluminum garnet) particles available as product number QUMK58/F from Phosphor Technology Ltd., Nazeing, Essex, England. Particles of this phosphor material have a typical diameter of about 5 microns (Tm), range from 1 to 10 Tm, absorb light of wavelengths from about 430 nm to about 490 nm, and emit light in a broad band from about 510 nm to about 610 nm. The color of light emitted by an LED having a stenciled phosphor layer is determined, in part, by the concentration of phosphor particles in the luminescent stenciling composition.

The phosphor particles may be mixed with the curable silicone polymer composition at concentrations ranging from about 20 grams of phosphor particles per 100 grams of silicone polymer composition to about 120 grams of phosphor particles per 100 grams of silicone polymer composition. In some implementations, the titanium dioxide particles may also be used as additives and dispersed in the silicone polymer composition at a concentration of about 1.5 grams of titanium dioxide per 100 grams of silicone polymer composition to about 5.0 grams of titanium dioxide per 100 grams of silicone polymer composition. The titanium dioxide particles, which are approximately the same size as the phosphor particles, increase the scattering of excitation light and thus increase the absorption of that light by the phosphor particles.

Next, after the phosphor particles and optional titanium dioxide particles are mixed with the curable silicone composition, finely divided silica particles are dispersed in the mixture to form a thixotropic gel. A thixotropic gel exhibits thixotropy, i.e., an apparent drop in viscosity when subjected to shear and a return to the original viscosity level when the shear force is removed. Consequently, a thixotropic gel behaves as a fluid when shaken, stirred, or otherwise disturbed and sets again to a gel when allowed to stand. The silica particles may be, e.g., particles of fumed silica, a colloidal form of silica made by combustion of chlorosilanes in a hydrogen-oxygen furnace. Fumed silica is chemically and physically stable at temperatures exceeding 120° C., transparent to visible light, and will impart satisfactory thixotropic properties to the luminescent stenciling composition at comparatively low concentrations. The grade of fumed silica used chosen to be compatible with non-polar materials.

In one implementation, the fumed silica is M-5P grade CAB-O-SIL®. untreated amorphous fumed silica obtained from Cabot Corporation of Boston, Mass. This grade of fumed silica is hydrophobic and has an average surface area per unit mass of $200\pm 15$ $m^2/g$. The M-5P grade fumed silica particles are dispersed in the mixture of phosphor particles and silicone polymer composition with a conventional three roll mill at concentrations of about 1.5 grams of fumed silica per 100 grams of silicone polymer composition to about 4.5 grams of fumed silica per 100 grams of silicone polymer composition. As the concentration of fumed silica is increased, the stenciling composition becomes more thixotropic, i.e., more solid-like as an undisturbed gel.

Other implementations use fumed silica having a surface area per unit mass either greater than or less than $200\pm 15$ $m^2/g$. For fixed concentrations of fumed silica, stenciling compositions become more thixotropic as the surface area per unit mass of the fumed silica is increased. Thus, fumed silicas having lower surface area per unit mass must be used at higher concentrations. The required high concentrations of low surface area per unit mass fumed silicas can result in stenciling compositions having viscosities that are too high to be easily stenciled. Consequently, the fumed silica preferably has a surface area per unit mass greater than about 90 $m^2/g$. In contrast, as the surface area per unit mass of the fumed silica is increased, the required concentration of fumed silica decreases, but the fumed silica becomes more difficult to disperse in the silicone polymer composition.

The examples of phosphors described in the PCT Patent Application Publication No. WO 01/24229 include host materials and dopant ions. The host material may have an inorganic, ionic lattice structure (a "host lattice") in which the dopant ion replaces a lattice ion. The dopant is capable of emitting light upon absorbing excitation radiation. Suitable dopants strongly absorb excitation radiation and efficiently convert this energy into emitted radiation. As an example, the dopant may be a rare earth ion which absorbs and emits radiation via 4f-4f transitions, i.e. electronic transitions involving f-orbital energy levels. While f-f transitions are quantum-mechanically forbidden, resulting in weak emission intensities, it is known that certain rare earth ions, such as $Eu^{2+}$ or $Ce^{3+}$, strongly absorb radiation through allowed 4f-5df transitions (via d-orbital/f-orbital mixing) and consequently produce high emission intensities. The emissions of certain dopants can be shifted in energy depending on the host lattice in which the dopant ion resides. Certain rare earth dopants efficiently convert blue light to visible light when incorporated into an appropriate host material.

In some implementations, the first and second phosphors comprise a host sulfide material, i.e. a lattice which includes sulfide ions. Examples of suitable host sulfide materials include CaS, SrS and a thiogallates such as $SrGa_2S_4$. A phosphor mixture may be formed by different rare earth ions that are excitable by one common blue energy source of a relatively narrow linewidth to emit light at two different energy ranges (e.g. red and green). As an example for such a phosphor mixture, the dopant is the same in the first and second phosphors with different host materials. The red and green emissions of the two phosphors can be tuned by selecting an appropriate host material. In one embodiment, the green phosphor is $SrGa_2S_4$:Eu. In another embodiment, the red phosphor is selected from the group consisting of SrS:Eu and CaS:Eu.

The examples of phosphors described in U.S. Patent Application Publication No. 2004/0263074 include particles which are characterized as being capable of down-conversion, that is, after being stimulated (excitation) by relatively shorter wavelength light, they produce longer wavelength light (emission). The phosphor composition comprises at least one, typically at least two (or three, or four) types of phosphor particles, which each have their own emission characteristics. In an embodiment having at least two different types of phosphor particles, the first type of phosphor particle emits red light upon excitation, and the second type of phosphor particle emits green light upon excitation. For red emission, typical phosphor particles suitable for use in the phosphor composition may comprise a material selected from SrS: $Eu^{2+}$; CaS:$Eu^{2+}$; CaS:$Eu^{2+}$,$Mn^{2+}$; (Zn, Cd)S:$Ag^+$; $Mg_4GeO_{5.5}F$:$Mn^{4+}$; $Y_2O_2S$:$Eu^{2+}$, ZnS:$Mn^{2+}$, and other phosphor materials having emission spectra in the red region of the visible spectrum upon excitation. For green emission, typical phosphor particles suitable for use in the phosphor composition may comprise a material selected from $SrGa_2S_4$:$Eu^{2+}$; ZnS:Cu, Al and other phosphor materials having emission spectra in the green region of the visible spectrum upon excitation.

In some implementations, blue emitting phosphor particles may be included in the phosphor composition in addition to the red- and green-emitting phosphors; suitable blue emitting phosphor particles may comprise, e.g. $BaMg_2Al_{16}O_{27}$:$Eu^{2+}$, Mg or other phosphor materials having emission spectra in the blue region of the visible spectrum upon excitation. In other implementations, the phosphor composition may comprise a type of phosphor particles that is selected to produce yellow light upon excitation. For yellow emission, phosphor particles suitable for use in the phosphor composition may include a material selected from $(Y, Gd)_3Al_5O_{12}$:Ce, Pr and other phosphor materials having emission spectra in the yellow region of the visible spectrum upon excitation.

Some suitable red-emitting phosphor particles may have a peak emission wavelength in the range of about 590 nm to about 650 nm. In particular embodiments, the phosphor particles have a peak emission wavelength in the range of about 620 nm to about 650 nm, typically in the range of about 625 nm to about 645 nm, more typically in the range of about 630 nm to about 640 nm. In other embodiments, the phosphor particles have a peak emission wavelength in the range of about 590 nm to about 625 nm, typically in the range of about 600 nm to about 620 nm. In yet other embodiments, the phosphor particles may emit light having a wavelength in the range of about 600 nm to about 650 nm, typically in the range of about 610 nm to about 640 nm, more typically in the range of about 610 nm to about 630 nm.

Some suitable green-emitting phosphor particles may have a peak emission wavelength in the range of about 520 nm to about 550 nm. In particular embodiments, the phosphor particles have a peak emission wavelength in the range of about 530 nm to about 550 nm, typically in the range of about 535 nm to about 545 nm. In other embodiments, the phosphor particles have a peak emission wavelength in the range of about 520 nm to about 535 nm. In yet other embodiments, the phosphor particles emit light having a wavelength in the range of about 520 nm to about 550 nm, typically in the range of about 535 nm to about 550 nm, or in the range of about 520 nm to about 535 nm.

Some suitable blue-emitting phosphor particles typically have a peak emission wavelength in the range of about 440 nm to about 490 nm. In particular embodiments, the phosphor particles have a peak emission wavelength in the range of about 450 nm to about 470 nm, typically in the range of about 455 nm to about 465 nm. In other embodiments, the phosphor particles have a peak emission wavelength in the range of about 440 nm to about 450 nm, typically in the range of about 435 nm to about 445 nm. In yet other embodiments, the phosphor particles emit light having a wavelength in the range of about 440 nm to about 480 nm, typically in the range of about 450 nm to about 470 nm.

Some suitable yellow-emitting phosphor particles typically have a peak emission wavelength in the range of about 560 nm to about 580 nm. In particular embodiments, the phosphor particles have a peak emission wavelength in the range of about 565 nm to about 575 nm. In other embodiments, the phosphor particles have a peak emission wavelength in the range of about 575 nm to about 585 nm. In yet other embodiments, the phosphor particles emit light having a wavelength in the range of about 560 nm to about 580 nm, typically in the range of about 565 nm to about 575 nm.

The exact wavelength range for each of the above described type of phosphor particles may be determined by selection from available sources of phosphors, desired color attributes of the light emitting device (e.g. the 'correlated color temperature' of the emitted white light), choice of the excitation light such as the excitation wavelength, and the like. Useful phosphor materials and other information may be found in Mueller-Mach et al., "High Power Phosphor-Converted Light Emitting Diodes Based on III-Nitrides", IEEE J. Sel. Top. Quant. Elec. 8(2):339 (2002).

The examples of phosphors described in the published PCT Application No. PCT/US99/28279 include $Ba_2MgSi_2O_7$:$Eu^{2+}$; $Ba_2SiO_4$: $Eu^{2+}$; and (Sr, Ca, Ba)(Al, Ga)$_2S_4$: $Eu^{2+}$, where the element following the colon represents an activator. The notation (A, B, C) signifies ($A_x$,$B_y$,$C_z$) where $0 \leq x \leq 1$ and $0 \leq y \leq 1$ and $0 \leq z \leq 1$ and $x+y+z=1$. For example, (Sr, Ca, Ba) signifies ($Sr_x$,$Ca_y$,$Ba_z$) where $0 \leq x \leq 1$ and $0 \leq y \leq 1$ and $0 \leq z \leq 1$ and $x+y+z=1$. Typically, x, y, and z are all nonzero. The notation (A, B) signifies ($A_x$,$B_y$) where $0 \leq x \leq 1$ and $0 \leq y \leq 1$ $x+y=1$. Typically, x and y are both non-zero. Examples of green emitting phosphors may have peak emissions between about 500 nm and about 555 nm. For example, $Ba_2MgSi_2O_7:Eu^{2+}$ has a peak emission at about 495-505 nm, typically about 500 nm, $Ba_2SiO_4$: Eu2+ has a peak emission at about 500-510 nm, typically about 505 nm, and $(Sr, Ca, Ba)(Al, Ga)_2S_4:Eu^{2+}$ has a peak emission at about 535-545 nm, typically about 540 nm.

The examples of phosphors described in U.S. Patent Application Publication No. 2001/0050371 include fluorescent materials that include a CaS phosphor activated by Eu, phosphors represented by $AEu_{(1-x)}Ln_xB_2O_8$ where A is an element selected from the group consisting of Li, K, Na and Ag; Ln is an element selected from the group consisting of Y, La and Gd; and B is W or Mo; and x is number equal to or larger than 0, but smaller than 1. A CaS phosphor activated by Eu or a phorsphor of $AEu_{(1-x)}Ln_xB_2O_8$ may be mixed with a base polymer to form a transparent resin.

As an example, a red phosphor that emits red light may be CaS activated by Eu or a compound expressed by a general formula $AEu_{(1-x)}Ln_xB_2O_8$. CaS activated by Eu is excited by light of 420 to 600 nm and emits light of 570 to 690 nm which peaks at 630 nm. $AEu_{(1-x)}Ln_xB_2O_8$ is a phosphor which emits light near 614 nm by transition of $Eu^{3+}$ ions. Although an excitation wavelength and an emission wavelength differ depending on the kinds of elements A and B of the phosphor, the red phosphors can be excited by light near 470 nm (blue) and or 540 nm (green) and can emit light near 620 nm (red). When x is zero, the phosphor $AEuB_2O_8$ is formed and exhibits the highest emission intensity near 615 nm (red). $AEu_{(1-x)}Ln_xB_2O_8$ (A=Li, K, Na, Ag; Ln=Y, La, Gd; B=W, Mo) may be obtained by mixing oxides, carbonate and the like of elements which constitute the phosphor at a desired stoichiometric ratio. In addition to the above red phosphors, a yttrium aluminate phosphor (so-called YAG) can be a stable oxide having a garnet structure in which Y-atoms of $Y_3Al_5O_{12}$ are substituted by Gd at part of their positions, particularly a phosphor which is excited by blue light (400 to 530 nm) to emit light of yellow to green region centering 550 nm. Activating elements to be added to the yttrium aluminate phosphor include, for example, cerium, europium, manganese, samarium, terbium, tin, chromium, etc. For example, $Y_xGd_{3-x}Al_5O_{12}$ activated by Ce may be used. In implementations, one, two or more kinds of such YAG phosphors may be mixed together to form a desired phosphor material.

The examples of phosphors described in U.S. Pat. No. 6,252,254 include $YBO_3:Ce^{3+},Tb^{3+}$; $BaMgAl_{10}O_{17}:Eu^{2+}$, $Mn^{2+}$; $(Sr,Ca,Ba)(Al,Ga)_2S_4:Eu^{2+}$; and $Y_3Al_5O_{12}:Ce^{3+}$; and at least one of: $Y_2O_2S:Eu^{3+},Bi^{3+}$; $YVO_4:Eu^{3+},Bi^{3+}$; SrS: $Eu^{2+}$; $SrY_2S_4:Eu^{2+}$; $SrS:Eu^{2+},Ce^{3+},K^+$; $(Ca, Sr)S:Eu^{2+}$; and $CaLa_2S_4:Ce^{3+}$, where the element following the colon represents an activator. As an example, the $SrS:Eu^{2+},Ce^{3+},K^+$ phosphor, when excited by blue light, emits a broadband spectrum including red light and green light. These phosphor compositions can be used to produce white light with pleasing characteristics, such as a color temperature of 3000-4100° K, a color rendering index of greater than 70, typically greater than 80, for example about 83-87, and a device luminous efficacy of about 10-20 lumens per watt of input electric power when blue LED is used as the excitation source.

The examples of phosphors described in U.S. Patent Application Publication No. 2002/0003233 include a single crystal Cerium-doped Yttrium-Aluminum-Garnet $(Y_3Al_5O_{12}:Ce^{3+})$ compound as a yellowish-light-emitting phosphor. Yttrium-Aluminum-Oxides which do not have garnet structures, such as monoklinic YalO and YalO-perovskite, may also be used as the host materials for the phosphors. Several lanthanides (Ln) may partly replace the Yttrium, such as in (Y, Ln)AlO, (Y, Ln)(Al, Ga)O. The lanthanide may be, for example Lutethium (Lu). These host materials may be doped with single dopants such as Cerium (Ce), Praseodymium (Pr), Holmium (Ho), Ytterbium (Yb), and Europium (Eu), or with double dopants such as (Ce, Pr), (Ce, Ho), and (Eu, Pr) to form various phosphors. $Y_3Al_5O_{12}:Ho^{3+}$, and $Y_3Al_5O_{12}:Pr^{3+}$ are examples of single crystal phosphor materials. In one embodiment, a phosphor listed above emits yellowish light by absorbing either bluish light or ultraviolet light having a wavelength that is shorter than or equal to about 460 nm. In one example, a YAG substrate doped with 4 mol % Cerium $(Ce^{3+})$ can absorb light having a wavelength of about 410-460 nm and emit yellowish light having a peak wavelength of about 550-570 Tm. any. Part of the Yttrium in YAG may be substituted by a lanthanide element such as Gadolinium (Gd). For example, a phosphor may be $(Y_{0.75}Gd_{0.25})$ AG:Ce.

The examples of phosphors described in European Patent Application No. 1,150,361 include a resin comprising a phosphor selected from the phosphor family chemically identified as $(Sr, Ca, Ba)S:Eu^{2+}$. One phosphor selected from this family is strontium sulfide doped with europium, which is chemically defined as $SrS:Eu^{2+}$ and has a peak emission at 610 nm. Rather than using phosphor-converting resins, dyes or epoxies, other types of phosphor converting elements may also be used, including phosphor-converting thin films, phosphor-converting substrates, or various combinations of these elements.

The examples of phosphors described in U.S. Patent Application Publication No. 2002/0145685 include a red phosphor $SrS:Eu^{2+}$ and a green phosphor $SrGa_2S_4:Eu^{2+}$. These phosphors are excitable by the 460 nm blue light.

The examples of phosphors described in U.S. Patent Application Publication No. 2005/0001225 include rare-earth element doped oxide nitride phosphor or cerium ion doped lanthanum silicon nitride phosphor. A rare-earth element doped oxide nitride in the following examples is a crystalline material, not including a glass material such as oxynitride glass. However, it may include a small amount of glass phase (e.g., less than 5%). A cerium ion doped lanthanum silicon nitride in the following examples is a crystalline material, not including a glass material.

One example of a first phosphor is single-phase 1-sialon phosphor that is represented by: $Me_xSi_{12-(m+n)}Al_{(m+n)}O_nN_{16-n}:Re1_yRe2_z$. Part or all of metal (Me) (Me is one or more of Li, Ca, Mg, Y and lanthanide metals except for La and Ce) dissolved into the I-sialon is replaced by lanthanide metal (Re1) (Re1 is one or more of Ce, Pr, Eu, Tb, Yb and Er) as luminescence center or lanthanide metal (Re1) and lanthanide metal (Re2) (Re2 is Dy) co-activator. In this case, Me may be one or more of Ca, Y and lanthanide metals except for La and Ce. In some implementations, Me may be Ca or Nd. The lanthanide metal (Re1) used for replacing may be Ce, Eu or Yb. In case of using two kinds of metals for replacing, for example, a combination of Eu and Er may be used. In case of using three kinds of metals for replacing, for example, a combination of Eu, Er and Yb may be used.

Also, the metal (Me) may be replaced by lanthanide metal Re1 and lanthanide metal Re2 as co-activator. The lanthanide metal Re2 is dysprosium (Dy). In this case, the lanthanide metal Re1 may be Eu. Meanwhile, if part or all of metal (Me) replaced by one or more of Ce, Pr, Eu, Tb. Yb and Er (lanthanide metal (Re1)), or one or more of Ce, Pr, Eu, Tb, Yb and Er (lanthanide metal (Me) (Re1)) and Dy (lanthanide metal (Re2)), then the metal is not necessarily added and may be replaced by another metal.

A-sialon (I-sialon) has a higher nitrogen content than oxynitride glass and is represented by: $N_xSi_{12-(m-n)}Al_{(m+n-)}O_nN_{16-n}$ where x is a value obtained dividing (m) by a valence of metal (M). Meanwhile, oxynitride glass is as described in prior art 3, such a phosphor that serves to shift the position of excitation/emission peak of conventional oxide system phosphors to the longer wavelength side by replacing oxygen atom surrounding the rare-metal element as luminescence center by nitrogen atom to relax the influence of surrounding atoms to electron of rare-metal element, and that has an excitation spectrum extending until visible region ($\leq$500 Tm).

Also, in the single-phase I-sialon phosphor, the metal (Me) is dissolved in the range of, at the minimum, one per three unit cells of I-sialon including four mass weights of $(Si, Al)_3(N, O)_4$ to, at the maximum, one per one unit cell thereof. The solid solubility limit is generally, in case of bivalent metal (Me), $0.6<m<3.0$ and $0\leq n<1.5$ in the above formula and, in case of trivalent metal (Me), $0.9<m<4.5$ and $0\leq n<1.5$. It is estimated that, in a region except for those regions, single-phase I-sialon phosphor is not obtained.

The interionic distance of lanthanide metal Re1 as luminescence center to replace part or all of metal (Me) and to serve as activator is about 5 angstroms at the minimum. It is significantly greater than 3 to 4 angstroms in phosphor known thus far. Therefore, it can prevent a significant reduction in emission intensity due to concentration quenching generated when a high concentration of lanthanide metal as luminescence center is included in matrix material.

Further in the single-phase I-sialon phosphor, the metal (Me) is replaced by lanthanide metal (Re2) as I-activator as well as lanthanide metal (Re1) as luminescence center. It is assumed that lanthanide metal (Re2) has two co-activation effects. One is sensitizer function and the other is to newly generate a carrier trap level to develop or improve the long persistence or to improve the thermal luminescence. Since the lanthanide metal Re2 is co-activator, it is suitable that the replacement amount thereof is generally $0.0\leq z<0.1$ in the earlier formula.

The single-phase I-sialon phosphor has I-sialon as a matrix material, and is essentially different in composition and crystal structure from a phosphor having $\theta$-sialon as matrix material.

Namely, $\theta$-sialon is represented by: $Si_{6-z}Al_zO_zN_{8-z}$ ($0<z<0.2$), and it is solid solution of $\theta$-type silicon nitride where part of Si sites is replaced by Al and part of N sites is replaced by O. In contrast, I-sialon is represented by: $Me_xSi_{12-(m+n)}Al_{(m+n)}O_nN_{16-n}$, and it is a solid solution of I-type silicon nitride, where part of Si—N bonds is replaced by Al—N bond and a specific metal (Me) (Me is one or more of Li, Ca, Mg, Y and lanthanide metals except for La and Ce) invades between lattices and is dissolved therein. Thus, both are different in state of solid solution and, therefore, the $\theta$-sialon has a high oxygen content and the I-sialon has a high nitrogen content. So, if a phosphor is synthesized using $\theta$-sialon as matrix material and adding one or more of rare-earth oxides of Ce, Pr, Eu, Tb, Yb and Er as luminescence center, it becomes a mixed material that has a compound including a rare-earth metal between $\theta$-sialon particles since the $\theta$-sialon does not dissolve metal.

In contrast, if I-sialon is used as matrix material, the metal (Me) (Me is one or more of Li, Ca, Mg, Y and lanthanide metals except for La and Ce) is taken and dissolved in the crystal structure and the metal (Me) is replaced by rare-earth metal, Ce, Pr, Eu, Tb, Yb and Er as luminescence center. Therefore, the oxide nitride phosphor composed of single-phase I-sialon structure can be obtained.

Accordingly, the composition and crystal structure of phosphor drastically changes by whether to use $\theta$-sialon or I-sialon as matrix material. This is reflected in emission characteristics of phosphor.

In case of using $\theta$-sialon as matrix material, for example, a phosphor that is synthesized adding Er oxide to $\theta$-sialon radiates a blue luminescent light (410-440 nm). In I-sialon, as described later, rare-earth element doped oxide nitride phosphor radiates orange to red light (570-590 nm) due to the activation of Er. Viewing from this phenomenon it is assumed that Er is taken in the crystal structure of I-sialon and, thereby, Er is influenced by nitrogen atom composing the crystal and, therefore, the elongation of light source wavelength, which is very difficult to realize in phosphor with oxide as matrix material, can be easily generated.

In case of using I-sialon as matrix material, the rare-earth element doped oxide nitride phosphor also has the advantages of matrix material, I-sialon. Namely, I-sialon has excellent thermal and mechanical properties and can prevent the thermal relaxation phenomenon that causes a loss in excitation energy. Therefore, in the rare-earth element doped oxide nitride phosphor, a ratio of reduction in emission intensity according to rise of temperature becomes small. Thus, the temperature range available can be broadened as compared to the conventional phosphor.

Furthermore, I-sialon has an excellent chemical stability. Therefore, the phosphor has an excellent heat resistance. The rare-earth element doped oxide nitride phosphor can be excited by ultraviolet rays to X-rays further electron beam, according to O/N ratio in its composition, selection of lanthanide metal Re1 to replace metal (Me), and existence of lanthanide metal Re2 as I-activator.

Especially, of rare-earth element doped oxide nitride phosphor, in $Me_xSi_{9.76}Al_{2.25}O_{0.75}N_{15.25}:Re1_yRe2_z$ (m=1.5, n=0.75), one that satisfies $0.3<x+y<0.75$ and $0.01<y+z<0.7$ (where $y>0.01$, $0.0\leq z<0.1$) or $0.3<x+y+z<1.5$, $0.01<y<0.7$ and $0.0\leq z<0.1$, and metal (Me) is Ca offers an excellent emission characteristic and can have great potential in applications not only as ultraviolet-visible light excitation phosphor but also as electron beam excitation phosphor.

Different from the above first phosphor, an example of a second phosphor is a rare-earth element doped oxide nitride phosphor that contains I-sialon as main component (hereinafter referred to as mixture I-sialon phosphor). This second phosphor includes I-sialon, which dissolves a rare-earth element allowing an increase in brightness of a white LED using blue LED chip as light source, $\theta$-sialon, and unreacted silicon nitride. As the result of researching a composition with high emission efficiency, a mixture material with a property equal to single-phase I-sialon phosphor is found that is composed of I-sialon that part of Ca site in I-sialon stabilized by Ca is replaced by one or more of rare-earth metal (M) (where M is Ce, Pr, Eu, Tb, Yb or Er), $\theta$-sialon and unreacted silicon nitride. In some implementations, M is preferably Ce, Eu or Yb and further preferably Ce or Eu.

The mixture I-sialon phosphor can be produced adding less rare-earth element than the single-phase I-sialon phosphor. Thus, the material cost can be reduced. Further, since the mixture I-sialon phosphor also has I-sialon as matrix material like the single-phase I-sialon phosphor, it can have the advantages of matrix material I-sialon, i.e. good chemical, mechanical and thermal properties. Thus, it offers a stable and long-lifetime phosphor material. Due to these properties, it can suppress thermal relaxation phenomenon causing a loss in excitation energy. Therefore, in I-sialon with dissolved rare-earth element as well as Ca in this embodiment, a ratio of reduction in emission intensity according to rise of temperature becomes small. Thus, the temperature range available can be broadened as compared to the conventional phosphor.

Furthermore, the mixture I-sialon phosphor can be excited by ultraviolet rays to X-rays further electron beam, according to O/N ratio in its composition and selection of metal (M).

The mixture I-sialon phosphor offers a material that has an emission property equal to the single-phase I-sialon phosphor even when reducing the amount of rare-earth metal added. In order to stabilize the I-sialon structure, it is necessary to dissolve more than a certain amount of element. When amounts of Ca and trivalent metal dissolved are given x and y, respectively, a value of (x+y) is needed to be greater than 0.3 in thermodynamic equilibrium.

The mixture I-sialon phosphor includes an organ with θ-sialon and unreacted silicon nitride remained other than single-phase I-sialon phosphor because of less addition amount and not reaching the thermodynamic equilibrium.

The amount of added metal in the mixture I-sialon phosphor is in the range of 0.05<(x+y)<0.3, 0.02<x<0.27 and 0.03<y<0.3 in chemical composition of powder. If the amount of added metal is less than the lower limit, the amount of I-sialon lowers and the emission intensity lowers. If the amount of added metal is greater than the upper limit, only I-sialon remains. Therefore, the object of high brightness can be completed. In the range defined above, the mixture I-sialon phosphor can be obtained that is composed of: I-sialon of 40 weight % or more and 90 weight % or less; θ-sialon of 5 weight % or more and 40 weight % or less; and unreacted silicon nitride of 5 weight % or more and 30 weight % or less. The reason why the emission intensity is high even with the unreacted silicon nitride included is that I-sialon epitaxially grows on unreacted silicon nitride and its surface portion mainly responds to excitation light to offer an emission property substantially equal to only I-sialon.

The range may be 0.15<(x+y)<0.3, 0.10<x<0.25 and 0.05<y<0.15. In this range, the mixture I-sialon phosphor can be obtained that is composed of: I-sialon of 50 weight % or more and 90 weight % or less; θ-sialon of 5 weight % or more and 30 weight % or less; and unreacted silicon nitride of 5 weight % or more and 20 weight % or less.

The mixture I-sialon phosphor can be obtained by, e.g., heating $Si_3N_4$-$M_2O_3$—CaO—AlN—$Al_2O_3$ system mixed powder at 1650 to 1900° C. in inert gas atmosphere to get a sintered body, then powdering it. Since CaO is so instable that it easily reacts with moisture vapor in the air, it is generally obtained by adding in the form of calcium carbonate or calcium hydroxide, then making it CaO in the process of heating at high temperature.

The chemical composition of mixture I-sialon phosphor can be defined using the composition range of M-I-sialon, Ca—I-sialon and θ-sialon. Namely, in the range of three composition lines of $Si_3N_4$-a($M_2O_3$.9AlN), $Si_3N_4$-b (CaO.3AlN) and $Si_3N_4$-c(AlN.$Al_2O_3$), it is defined $4\times10^{-3}<a<4\times10^{-2}$, $8\times10^{-3}<b<8\times10^{-1}$ and $10^{-2}<c<8\times10^{-1}$.

An example of a third phosphor is a cerium ion doped lanthanum silicon nitride phosphor: $La_{1-x}Si_3N_5$:xCe (doping amount x is 0<x<1), where lanthanum site is replaced in solid dissolution by cerium ion activator. If the doping amount is 0.1<x<0.5, it is ultraviolet light excitation phosphor and, if the doping amount is 0.0<x<0.2, it is electron beam excitation phosphor.

Lanthanum silicon nitride ($LaSi_3N_5$) has an excellent thermal stability and serves to suppress the thermal relaxation phenomenon in the process of phosphor emission. Therefore, a loss in excitation energy can be reduced and a ratio of reduction in emission intensity according to rise of temperature becomes small. Thus, in the cerium ion doped lanthanum silicon nitride phosphor, the temperature range available can be broadened as compared to the conventional phosphor.

Also, the lanthanum silicon nitride ($Lasi_3N_5$) has excellent chemical stability and is light resistance.

The cerium ion doped lanthanum silicon nitride phosphor satisfies a blue chromaticity value and has excellent thermal stability, mechanical property and chemical stability. Therefore, it can have great potential in applications for fluorescent character display tube (VFD), field emission display (FED) etc. that may be used in severe environment.

The examples of phosphors described in U.S. Pat. No. 5,998,925 include a garnet fluorescent material comprising 1) at least one element selected from the group consisting of Y, Lu, Sc, La, Gd and Sm, and 2) at least one element selected from the group consisting of Al, Ga and In, and being activated with cerium. $Y_3Al_5O_{12}$:Ce and $Gd_3In_5O_{12}$:Ce are two examples. The presence of Y and Al enables a phosphoer to increase the luminance. For example, in a yttrium-aluminum-garnet fluorescent material, part of Al may be substituted by Ga so that the proportion of Ga:Al is within the range from 1:1 to 4:6 and part of Y is substituted by Gd so that the proportion of Y:Gd is within the range from 4:1 to 2:3.

Other examples of phosphor include $(Re_{1-r}Sm_r)_3(Al_{1-s}Ga_s)_5O_{12}$:Ce, where $0 \leq r < 1$ and $0 \leq s \leq 1$ and Re is at least one selected from Y and Gd, $(Y_{1-p-q-r}Gd_pCe_qSm_r)_3(Al_{1-s}Ga_s)_tO_{12}$ as the phosphor, where $0 \leq p \leq 0.8$, $0.003 \leq q \leq 0.2$, $0.0003 \leq r \leq 0.08$ and $0 \leq s \leq 1$. In some implementations, a phosphor may include two or more yttrium-aluminum-garnet fluorescent materials, activated with cerium, of different compositions including Y and Al to control the emission spectrum of the phosphor. In other implementations, a phosphor may include a first fluorescent material represented by general formula $Y_3(Al_{1-s}Ga_s)_5O_{12}$:Ce and a second fluorescent material represented by the formula $Re_3Al_5O_{12}$:Ce, where $0 \leq s \leq 1$ and Re is at least one selected from Y, Ga and La. In addition, two or more fluorescent materials of different compositions represented by a general formula $(Re_{1-r}Sm_r)_3(Al_{1-s}Ga_s)_5O_{12}$:Ce, where $0 \leq r < 1$ and $0 \leq s \leq 1$ and Re is at least one selected from Y and Gd may be used as the phosphor in order to control the emitted light to a desired wavelength.

The examples of phosphors described in U.S. Pat. No. 6,765,237 include phosphors that absorb UV light from about 380 to about 420 nm and emit visible light of different colors. For example, a phosphor blend may include a first phosphor comprising $BaMg_2Al_{16}O_{27}$:$Eu^{2+}$(BAM) and a second phosphor comprising $(Tb_{1-x-y}A_xRE_y)_3D_zO_{12}$(TAG), where A is a member selected from the group consisting of Y, La, Gd, and Sm; RE is a member selected from the group consisting of Ce, Pr, Nd, Sm, Eu, Gd, Dy, Ho, Er, Tm, Yb, and Lu; D is a member selected from the group consisting of Al, Ga, and In; x is in the range from 0 to about 0.5, y is in the range from about 0 to about 0.2, and z is in the range from about 4 to about 5. As another example, a phosphor blend may include a first phosphor comprising $Tb_3Al_{4.9}O_{12}$:Ce and a second phosphor selected from the group consisting of $BaMg_2Al_{16}O_{27}$:$Eu^{2+}$ (BAM) and $(Sr, Ba, Ca, mg)_5(PO_4)_3Cl$: $Eu^{2+}$ The phosphors described in U.S. Patent Application Publication No. 2004/0227465 include various phosphor compositions as follows:

1. A rare earth element activated complex halide phosphor represented by the formula: $BaF_2$.a$BaX_2$.b$MgF_2$.c$BeF_2$.d$Me^{II}F_2$:eLn, where X is at least one halogen selected from the group consisting of chlorine, bromine and iodine; $Me^{II}$ is at least one divalent metal selected from the group consisting of: calcium and strontium; Ln is at least one rare earth element selected from the group consisting of: divalent europium ($Eu^{2+}$), cerium ($Ce^{3+}$) and terbium ($Tb^{3+}$), and a is in the range between 0.90 and 1.05, b is in the range of 0 to 1.2; c is in the range of between 0 and 1.2, and d is defined by the sum of c+d being in the range of between 0 and 1.2, and $BeF_2$ is present in an amount sufficient to effect a phosphor exhibiting a higher luminance than said phosphor absent $BeF_2$ when stimulated by light of a wavelength ranging from 450 to 800 nm after exposure to X-rays. See U.S. Pat. No. 4,512,911 for additional details.

2. A cerium activated rare earth halophosphate phosphor having the formula: $LnPO_4 \cdot aLnX_3:xCe^{3+}$ in which Ln is at least one rare earth element selected from the group consisting of Y, La, Gd and Lu; X is at least one halogen selected from the group consisting of F, Cl, Br and I; and a and x are numbers satisfying the conditions of $0.1<a<10.0$ and $0<x<0.2$, respectively and exhibiting a higher stimulated emission upon excitation with a He—Ne laser of a wavelength 632.8 nm after exposure to X-rays at 80 KVp, than the phosphor wherein a is less than 0.1. See U.S. Pat. No. 4,661,419 for additional details.

3. A mixed single-phase strontium and lanthanide oxide with a magnetolead type crystalline structure having the formula (I): $Sr_xLn1_{y1}Ln2_{y2}Ln3_{y3}M_zA_aB_bO_{19-k(I)}$ in which Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminum and gallium; B represents at least one trivalent transition metal selected from chromium and titanium; x, y1, y2, y3, z, a, b and k represent numbers so that $0<x<1$, $0<y1<1$, $0<y2<1$, $0<y3<1$, $0<z<1$, $10.5<a<12$, $0<b<0.5$ and $0<k<1$ provided that $0<x+y1+y2+y3<1$ and that $11<z+a+b<12$. See U.S. Pat. No. 5,140,604 for additional details.

4. A divalent europium activated alkaline earth metal halide phosphor having the formula: $M''X_2 \cdot aM''X'_2 \cdot bSiO:xEu^{2+}$ in which $M''$ is at least one alkaline earth metal selected from the group consisting of Ba, Sr and Ca; each of X and X' is at least one halogen selected from the group consisting of Cl, Br and I, and X is not the same as X'; a and x are numbers satisfying the conditions of $0.1<a<10.0$ and $0<x<0.2$, respectively; and b is a number satisfying the condition of $0<b<3\times10^{-2}$. See U.S. Pat. No. 5,198,679 for additional details.

5. A bright, short wavelength blue-violet phosphor for electro luminescent displays comprising an alkaline-based halide as a host material and a rare earth as a dopant. See U.S. Pat. No. 5,602,445. The host alkaline chloride can be chosen from the group II alkaline elements, particularly $SrCl_2$ or $CaCl_2$, which, with a europium or cerium rare earth dopant, electroluminesces at a peak wavelength of 404 and 367 nanometers respectively. The resulting emissions have CIE chromaticity coordinates which lie at the boundary of the visible range for the human eye thereby allowing a greater range of colors for full color flat panel electroluminescent displays.

6. An inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer consisting essentially of inorganic material comprising a matrix of lanthanum fluoride doped with at least one member selected from the group consisting of: rare earth element metals and compounds thereof. See U.S. Pat. No. 5,648,181 for additional details.

7. A radiographic phosphor screen comprising a support and, coated on the support, at least one layer forming a luminescent portion and an overcoat layer, the luminescent portion and overcoat layer including a binder that is transparent to X-radiation and emitted light and said luminescent portion including phosphor particles in a weight ratio of phosphor particles to binder of 7:1 to 25:1. The phosphor comprises oxygen and a combination of species characterized by the relationship: $(Ba_{1-q}M_q)(Hf_{1-z-e}Zr_zMg_e)$: yT wherein M is selected from the group consisting of Ca and Sr and combinations thereof; T is Cu; q is from 0 to 0.15; z is from 0 to 1; e is from 0 to 0.10; z+e is from 0 to 1; an y is from $1\times10^{-6}$ to 0.02. See U.S. Pat. No. 5,698,857 for additional details.

8. A garnet fluorescent material comprising: 1) at least one element selected from the group consisting of Y, Lu, Se, La, Gd and Sm; and 2) at least one element selected from the group consisting of Al, Ga and In, and being activated with cerium. One example is cerium-doped yttrium aluminum garnet $Y_3Al_5O_{12}:Ce$ (YAG:Ce) and its derivative phosphors. See U.S. Pat. No. 5,998,925 for additional details.

9. A wavelength-converting casting composition, for converting a wavelength of ultraviolet, blue or green light emitted by an electroluminescent component, comprising: a) a transparent epoxy casting resin; b) an inorganic luminous substance pigment powder dispersed in the transparent epoxy resin, the pigment powder comprising luminous substance pigments from a phosphorus group having the general formula: $A_3B_5X_{12}:M$, where A is an element selected from the group consisting of Y, Ca, Sr; B is an element selected from the group consisting of Al, Ga, Si; X is an element selected from the group consisting of O and S; and M is an element selected from the group consisting of Ce and Tb. The luminous substance pigments have grain sizes <20 Tm and a mean grain diameter $d_{50}$<5 Tm. See U.S. Pat. No. 6,066,861 for additional details.

10. Phosphors $Ba_2(Mg, Zn)Si_2O_7: Eu^{2+}$ and $(Ba_{1-X-Y-Z}, Ca_X, Sr_Y, Eu_Z)_2(Mg_{1-W}, Zn_W)Si_2O_7$, where $X+Y+Z=1$; $Z>0$; and $0.05<W<0.50$ in some implementations. In other implementations, $X+Y+Z=1$; $0.01 \leq X \leq 0.1$; and $0.1 \leq W<0.50$. X and Y can be zero or a non-zero number. Examples of UV-excitable phosphors for emitting green, red, and blue colors are $Ca_8Mg(SiO_4)_4Cl_2:Eu^{2+}$, $Mn^{2+}$; $Y_2O_3:Eu^{3+}$, $Bi^{3+}$; and $Ba_2(Sr, Ba, Ca)_5(PO_4)_3Cl:Eu^{2+}$ (or $BaMg_2Al_{16}O_{27}: Eu^{2+}$); respectively. See U.S. Pat. No. 6,255,670 for additional details.

The U.S. Patent Application Publication No. 2004/0227465 also discloses phosphors represented by $Sr_xBa_yCa_zSiO_4:Eu^{2+}$ in which x, y, and z are each independently any value between 0 and 2, including 0 and 2. In some implementations, divalent Eu, which serves as an activator, is present in any amount between 0.0001% and about 5% in mole percent based on the total molar weight of said composition. Thus, the activator, Eu, may be present in any amount between 0.0001% and 5.00% in mole percent based on the total molar weight of the composition, including every thousandth percentage therebetween. In other implementations, the parameters x, y and z are $0.5 \leq x \leq 1.5$; $0 \leq y \leq 0.5$; and $0.5 \leq z \leq 1.5$ in the above formula. In yet other implementations, the parameters x, y and z are $1.5 \leq x \leq 2.5$; $0 \leq y \leq 0.5$; and $0 \leq z \leq 0.5$ in the above formula. The parameters x, y and z may also be $1.0 \leq x \leq 2.0$; $0 \leq y \leq 1.0$; and $0 \leq z \leq 0.5$ in the above formula.

The above phosphor $Sr_xBa_yCa_zSiO_4:Eu^{2+}$ may further include at least one additional element selected from the group consisting of: Ce, Mn, Ti, Pb, and Sn. In some implementations, such an additional element is present in the phosphor in any amount between 0.0001% and 5.00% in mole percent based upon the total molar weight of the phosphor.

The examples of phosphors described in U.S. Patent Application Publication No. 2005/0023962 include $ZnS_xSe_y$:Cu, A in which x and y are each independently any value between 0 and 1 and A is at least one of Ag, Al, Ce, Tb, Cl, I, Mg, Mn. The monovalent Cu, which serves as the main activator, may be present in any amount between 0.0001% and about 5% in mole percent based on the total molar weight of said composition. Thus, the activator, Cu, may be present in any amount between 0.0001% and 5.00% in mole percent based on the total molar weight of the composition, including every thousandth percentage therebetween. In some implementations, the parameters x, y and z are $0.5 \leq x \leq 1$ and $0 \leq y \leq 0.5$ in the above formula. In other implementations, the parameters x, y and z are $0 \leq x \leq 0.5$ and $0 \leq y \leq 0.5$ in the above formula. The parameters x, y and z may also be $0 \leq x \leq 0.5$ and $0.5 \leq y \leq 1.0$ in the above formula.

The examples of phosphors described in U.S. Patent Application Publication No. 2005/023963 include thioselenide and/or selenide-based fluorescent materials which are capable of absorbing with high efficiency blue, violet, or ultraviolet (UV) light and emitting light of a wavelength longer than that absorbed from the light source. Such phosphor materials may be manufactured to emit broad color spectra that can be tuned from blue to green to yellow and red emissions. Two or more phosphors may be mixed in order to achieve a specific, desired white color performance. One example is $MA_2(S_xSe_y)_4$:B in which x and y are each independently any value between about 0.01 and about 1; M is at least one of Be, Mg, Ca, Sr, Ba, Zn; and A is at least one of Al, Ga, In, Y, La, and Gd; and the activator B is at least one of Eu, Ce, Cu, Ag, Al, Tb, Cl, F, Br, I, Pr, Na, K, Mg, and Mn. The divalent Eu, which can serve as the main activator, may be present in any amount between 0.0001% and about 10% in mole percent based on the total molar weight of said composition.

Thus, the activator, Eu, may be present in any amount between 0.0001% and 10.00% in mole percent based on the total molar weight of the composition, including every thousandth percentage therebetween. In some implementations, the parameters x, y, and z are $0.5 \leq x \leq 1$ and $0 \leq y \leq 0.5$ in the above formula. In other implementations, the parameter x, y and z are $0 \leq x \leq 5$ and $0.5 \leq y \leq 1.0$ in the above formula. In yet other implementations, x is about 0 and y is about 1 in the above formula, or x is about 1 and y is about 0 in the above formula.

Another example is $M_2A_4(S_xSe_y)_7$:B in which x and y are each independently any value between about 0.01 and about 1, M is at least one of Be, Mg, Ca, Sr, Ba, Zn; and A is at least one of Al, Ga, In, Y, La, and Gd; and B is at least one of Eu, Ce, Cu, Ag, Al, Tb, Cl, Br, F, I, Pr, K, Na, Mg, and Mn. The divalent Eu, which can serve as the main activator, may be present in any amount between 0.0001% and about 10% in mole percent based on the total molar weight of said composition. Thus, the activator, Eu, may be present in any amount between 0.0001% and 10.00% in mole percent based on the total molar weight of the composition, including every thousandth percentage there between. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$ in the above formula. In yet other implementations, x is about 1 and y is about 0 in the above formula, or x is about 0 and y=1 in the above formula, or $0 \leq x \leq 0.5$ and $0.5 \leq y \leq 1.0$ in the above formula, or x is about 0.75 and y is about 0.25 in the above formula.

Yet another example described in U.S. Patent Application Publication No. 2005/023963 is $(M1)_m(M2)_nA_2(S_xSe_y)_4$:B in which: M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 1, and M1 is different than M2. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

Yet another example described in U.S. Patent Application Publication No. 2005/023963 is: $(M1)_m(M2)_nA_4(S_xSe_y)_7$:B in which M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Th, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 2, and M1 is different than M2. In some implementations, the parameters x and y are $0.5 \leq x \leq 1$ and $0 \leq y \leq 0.5$ in the above formula. In other implementations, the parameters are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

In the above examples, the color generation is based on mixing of three primary colors of red, green, and blue. The described devices, systems, and techniques, however, may use mixing of four or more colors to generate the desired colors. For example, four different colors may be used. Accordingly, the screens shown in FIGS. 1 and 2 use four different color phosphor stripes and each color pixel includes four sub color pixels. The display systems in FIGS. 23-25 under this 4-color scheme can use four monochromatic laser display modules in four different colors to produce the final color images on the common display screen.

A phosphor screen, which may be used as either a projection screen or a final viewing screen may be fabricated by various techniques. Examples of fabrication techniques include, among others, the following: inkjet printing, painting, gravity settling, settling with compression, slurry, slurry with segregation, dusting, photo-tacky dusting, thin screen evaporation and sputtering, screen printing, pressed printing, pulsed laser deposition, centrifugal deposition, electrophoretic deposition, spraying, electrostatic dusting, tape transfer, reactive deposition, reactive evaporation, RF sputtering with ion implantation of activators, metal organic chemical vapor deposition (MOCVD), and atomic layer epitaxy.

1. Painting

The painting techniques apply luminescent paints on a substrate, such as fluorescent, phosphorescent and self-luminous painting materials. Paints can be organic or inorganic in nature and are used with a vehicle such as lacquers or oils. Paints can be applied with a brush, roller or a spraying device. Stencils may be used to obtain detailed spatial patterns. Paints can also be applied via off-set printing methods. These fluorescence and phosphorescent paints can be excited via IR, visible or UV radiation. In the self luminous paints the source of the excitation is a radioactive material (ex. Radium) mixed with the paint.

2. Settling by Gravity

Settling is a well known method and is documented in the literature. See, e.g., Pringsheim & Vogel, Luminescence of Liquids and Solids, Interscience Publishers, 1946, NY, pp 144&145; Hopkinson R. G., An Examination of Cathode Ray tube characteristics, Journal of the Institute of Electrical Engineers, Vol. 13, Part IIIa, No. 5 1946, pp. 779-794; Donofrio & Rehkopf, Screen Weight Optimization, Journal of the Electrochemical Society, Vol. 126, No. 9, September 1979, pp. 1563-1567; and Technical Information Booklet CM-9045, Method of Settling Phosphor Slides, GTE Sylvania, 3/82. For example, settling of phosphor slides may be achieved with a mixture of phosphor, a 1% barium acetate solution (in water), PS-6 potassium silicate and deionized water in a settling chamber. One recipe is to add 34 ml of the 1% barium acetate to the settling chamber. N. Yocom in the 1996 SID Seminar on Phosphor Screening discussed nine steps for settling and aluminizing a phosphor screen which are 1. settle phosphor on a face plate, 2. a liquid cushion is decanted and siphoned off, 3. dry the settled screen, 4. bake the screen, 5. rewet the screen, 6. apply a filming material on top of water, 7. remove water, 8. evacuate and evaporate the aluminum layer, 9. bake the screen.

3. Slurry

The slurry methods use a phosphor-containing slurry to form a phosphor layer over a screen surface. See, e.g., Tatayama, Yamazaki, Kato & Tashima, European Patent Application #86302192.9, filed Mar. 25, 1986 by Sony. One of his recipes is to use 100 g of phosphor, 0.6 g of Aerosil, with 5 g of PVA and 0.5 g of ADC (ammonium dichromate) and 100 g of water to form the slurry. This slurry is then deposited near the center of the face of a CRT screen panel and the panel is rotated and tilted to spread the slurry over the inside of the face plate. A cascaded slurry system may be used an aging effect where the silicate concentration is set to be higher on the glass substrate side than that on the electron gun side.

4. Dusting

Various dusting methods are known for forming phosphor screens. Hopkinson R. G. in "An Examination of Cathode Ray tube characteristics," Journal of the Institute of Electrical Engineers, Vol. 13, Part 111a, No. 5 1946, pp. 779-794 describes a dusting method where the phosphor is sprayed into a wet or dry binder. In another implementation, dusting can be done by allowing the phosphor to fall on or to be projected on a prepared surface. In yet another implementation of the dusting approach, the phosphor material may be agitated through a sieve or muslin gauze upon the screen plate coated with a suitable binder such as sodium silicate. The U.S. Pat. No. 3,025,161 entitled "Method of Forming Patterns" and issued Mar. 13, 1962 discloses a dusting method where the phosphor is dusted more vigorously via a dry powder spray system onto a wet photo-resist prior to exposure. In addition, phosphors are dusted on photo-tacky, coated dry surface and are exposed UV to allow the coating to become tacky. This tacky nature of the surface coating causes the phosphor in the exposed areas to be attached to the surface. See, Nonogaki, Tomita, Nishizawa, Akagi & Kohasji, "Dry Process for Phosphor Screen Fabrication of Multicolored Cathode Ray Tubes," Research & Development in Japan, 1984, pp. 50-55.

5. Settling with Compression

Phosphor screens can also be made by settling the phosphors with compression. See, e.g., Oki K. & Ozawa L., A phosphor screen for high-resolution CRTs, Journal of the SID, Vol. 3, No. 2, September 1995, pp. 51-57 which describes settling with normal sedimentation techniques and a use of a mechanical press machine to reduce the voids in the screen for high resolution uses.

6. Thin Film Screens Evaporation or Sputtering

High resolution screens can be made by evaporating or sputtering the phosphor on the substrate. For example, magnetron sputtering of $ZnGa_2O_4$ onto $BaTiO_3$ ceramic sheets have been used in thin film Electro-luminescent devices. Vacuum evaporation methods have been used to deposit a thin layer of phosphor on a substrate such as a SrS:Ce, Cl, Ag, Mn layer.

7. Screen Printing

Phosphor screens can also be made by screen printing techniques. In some implementations, a tight but spring-like cloth or metal mesh is used with areas blocked by a lacquer and aligned above a substrate to be coated. The slurry mix is then mechanically pressed through the selected areas of the mesh on to the substrate and the mesh springs back to its original position after the phosphor paste is applied. By photographic printing of patterns on a mesh, very fine patterns can be screen printed. In 1992 Morikawa et al discussed a method to achieve a smoother and better aging screen using a printing method plus screen compression. This compression method allows the manufacturer to achieve higher packing densities. See, Morikawa, Seko, Kamogawa & Shimojo, Study to Improve Flood Beam CRT for Giant Screen Display, Japan Display '92, pp 385-388.

8. Pulsed Laser Deposition

Laser pulses can be directed to target materials and deposit the target materials on a screen. Greer et al in 1994 reported a Pulsed Laser Deposition (PLD) of phosphor screens used in helmet mounted displays (HMD). See, Greer, J. A. et al., P-53 Thin Film Phosphors Prepared by Pulsed—Laser Deposition, SID 94 Digest, pp. 827-830. A rastered laser with a wavelength of 248 nm was used to scan targets of Yttrium Aluminum Gallium Garnet phosphors and to deposit these materials on to sapphire substrates by ablation. A screen growth rate of one micron per hour and screens of a thickness up to 8 microns were reported.

9. Centrifugal Deposition

A phosphor suspension in a solution can be deposited on a screen by using a centrifugal action. See, e.g., Mezner, L. Z., Zumer, M., Nemanic, V., Centrifugal Settling of High Resolution 1-in CRT Screens, SID Digest 1994, pp 520-522. CRT screens have been made by this method where a stable phosphor suspension is made with a fine grain (less than 5 micron particle size) phosphor, a binder, electrolyte and in some cases a dispersing agent. In some implementations, the settling in the centrifuge may be set at 3000 rpm for 2 minutes to 4000 rpm for 3 minutes. Screens of optimum screen weight of about 0.6 mg/cm² for 5 KV electrons was found using P20 phosphor with an average particle size of 1.9 microns. In a publication entitled "Preparation of P43 Suspension and Screen-Quality Evaluation in CRTs" (SID '97 vol 28, pp 440-443), it is reported that a suspension containing (1.8 micron) P43 phosphor, Barium Acetate, Potassium silicate and a surfactant was used in a centrifugal deposition process to achieve good electron aging with a screen weight of 1.0 mg/cm$^2$ at a screen thickness of approximately five particle diameters and an anode voltage of 5 KV.

10. Electrophoretic and Cataphoretic Coating

Electrophoretic or Cataphoretic phosphor coatings can be used to make high resolution phosphor screens. Schesinger described an electrophoretic coating process where a conductive coated glass face plate is put in a solution of a phosphor and electrolyte and a metallic anode (situated about two inches from the face plate). Sclesinger et al., Design Development and Fabrication of Ultra High-Resolution Cathode Ray tube. Technical Report ECOM-00476-February 1969, pp 64-72. When a DC electric current of 20 ma is passed through the solution the phosphor screen is deposited on the cathode. In May 1997, Schermerhorn, Sweeney & Wang from Electro Plasma and Park, Park and Kim from Samsung discussed the use of electrophoretic deposition of color phosphors for Plasma Display screens through the use of metalized recessed regions or cavities. J. M. Kim et al. Development of 4-in. Full Color FED, Devices SID97 Digest, pp 56-59; J. D. Schemerhorn et al. A Groved Structure for a Large High, Resolution Color ACPDP SID97 Digest, pp 229-232.

11. Spraying

Wet or dry phosphors can be sprayed on a substrate to form a phosphor screen. The nozzle of the spray gun can be changed to spray at various spray angles depending on the distance from the substrate and other constraints. A pressure pot is used as in various spray systems to keep the pressure constant to the spray gun. In the dry system, the dry phosphor is sprayed on the screen face whose surface is coated with an adhesive binder. wet binders and dry binders can be used. In wet spraying, an organic binder such as nitrocellulose or PVA may be used. A binder which becomes tacky under UV radiation bombardment may also be used.

11. Electrostatic Spray/Dust

Phosphor screens can also be made by using a phosphor spray or dusting process in which the phosphor is charged and blown against a charged screen surface. The phosphors are then fixed to allow further processing. The U.S. Pat. No. 5,477,285 entitled "CRT developing apparatus" and issued Dec. 19, 1995 describes a process where a tribo-electric gun is used to charge the phosphor, and the phosphor is fed to the panel using a hopper, an auger to transfer the material from the hopper to the venturi chamber. The venturi chamber dispenses the charged phosphor to the latent image on the panel.

12. Transfer Tape

In a transfer tape method, the phosphor is coated on a tape base with a layer to contain phosphor. Under the phosphor layer is a release layer and the phosphor and binder are pressed onto a substrate. The base tape is removed leaving the phosphor and binder. See, N. Yocom—1996 SID Seminar on Phosphor Screening.

13. Reactive Deposition

Vapor reaction processes can be used for fabricating phosphor layers such as ZnS phosphor layers. See, e.g., D. A. Cusano, Cathodo-, Photo-, and D. C-, Electro-luminescence in Zinc Sulfide Layers. Luminescence of Organic and Inorganic Materials Edited by Kallman & Spruch Wiley & Sons 1962, pp 494-522. The substrate to be coated can be heated to temperatures from 400-700 deg C. For example, in making the phosphor screen based on ZnS:Mn, materials Zn, $ZnCl_2$, $MnCl_2$ $H_2S$ are continuously present during the formation of the phosphor layer. This process can also be used for fabricating electroluminescent screens.

14. Reactive Evaporation

Reactive evaporation methods have been reported for making screens. Transparent thin films of $Y_2O_2S$:Eu have been formed by a reactive evaporation process where the Yttrium metal is evaporated onto a substrate using an electron beam gun and excited $SO_2$ is introduced while simultaneously heating a crucible of $EuCl_2$ powder. Daud, Futaki, Ohmi, Tanaki & Kobayashi, Transparent Y2O2S:Eu 3+ phosphor thin films grown by reactive evaporation and their luminescent properties, Journal of the Society for Information Display (SID), Vol 4, No 3 1996, pp 193-196.

15. RF Sputtering and Ion Implantation

In RF sputtering and ion implantation for forming phosphor screens, the activator ion is implanted. In N. M. Kalkhoran et al., Luminescence Study of Ion-Implanted, $ZnGa_2O_4$ Thin Films on Flexible Organic Substrates, SID '97 Digest, pp 623-626, RF sputtering was used to form thin film electroluminescent screens where $ZnGa_2O_4$ thin films were implanted on a flexible polyimide substrate with Mn, Eu to get green and red phosphor screens. The un-doped host material was used for the blue screen.

16. Metal Organic Chemical Vapor Deposition

Metal Organic Chemical Vapor Deposition (MOCVD) can be used to fabricate phosphor screens. As an example, a MOCVD process for fabricatingscreens with the $CaGa_2S_4$:Ce phosphor was reported by Smith et. Al., in "Crystalline-As-Deposited CaGa2S4:Ce via Low Temperature Metal Organic Chemical Vapor Deposition":SID Digest 1995, Vol. XXVI pp 728-731. Calcium metal-organics were used in the form of $Ca(2,2,6,6$-tetramethyl-3,5-heptanedionate$)_2$ called $Ca(thd)_2$. The CaS was deposited using $Ca(thd)_2$ in an argon carrier gas and $H_2S$. with reactor pressures from 1 to 10 Torr. Substrates were glass, silicon and coated EL substrates at temperatures from 400-600 deg C. The $Ga_2S_3$ and CaS formation was combined with the use of $Ce(thd)_4$ to obtain the $CaGa_2S_4$:Ce phosphor.

17. Atomic Layer Epitaxy

Atomic layer epitaxy has been used to form luminescent screens for alternating current thin film electroluminescent displays. See, Lindsay McDonald and Anthony Lowe, Display Systems, Publisher John Wiley & Sons 1997 pp. 195 & 196. A substrate was heated to a high temperature (500° C.) and was exposed to low pressure chemical precursors for forming the screen layers. As an example, Zn and Mn can be used as part of the precursors for forming a ZnS:Mn layer. The reactor is evacuated and Sulfur is introduced. The epitaxy cycle is then started to form the layers.

The phosphor materials used for screens described in this application may be prepared as phosphor nanoscale powders where in the phosphor materials are nanoscale particles or grains of 500 nm or less to produce enhanced optical conversion efficiency. Such phosphor nanoscale powders may be prepared by forming a solution or slurry which comprises phosphor precursors and then firing the solid residue of the solution or slurry which comprises the phosphor precursors. The phosphor precursors in the form of nano-sized particles or grains have a dimension less than 500 nm, preferably 200 nm or less, more preferably 100 nm or less, even more preferably 50 nm or less, and most preferably 10 nm or less. Thus, the nano-sized particles may have an average particle size of in the range from 1 nm to 500 nm, preferably 2 nm to 200 nm, more preferably 2 nm to 100 nm, even more preferably 2 nm to 50 nm, most preferably 3 nm to 10 nm. The nano-sized particles of the precursor will also preferably have a uniform size distribution with a variation within a range, e.g., 10% or less. U.S. Pat. No. 6,576,156, which is incorporated by reference in its entirety as part of this application, describes examples of phosphor nanoscale powders and fabrication techniques. In one implementation, phosphor nanoscale powders may be prepared by (1) forming a solution or slurry which contains nanosized particles of the phosphor precursors, (2) drying the solution or slurry to obtain a residue; and (3) firing the residue to form a phosphor nanoscale powder.

TABLE 2 lists example phosphor compositions and their respective emission colors from the various patent publications discussed above.

TABLE 2

Summary of Example Phosphors
Phosphor composition

Oxide-based Phosphors $(Y, Gd, La)_2O_3$:Eu, Sm, Ce, Bi; $(Y, Gd, La)O_2S$:Eu, Sm, Ce, Bi; $(Y, Gd, La)VO_4$:Eu, Sm, Ce, Bi;
$2SrO\cdot0.84P_2O_5\cdot0.16B_2O_3$:Eu; $SrLa_2BeO_5$:Ce; $0.82BaO\cdot6Al_2O_3$:Eu; $1.29BaO\cdot6Al_2O_3$:Eu; $(Ca, Zn)_2GeO_4$:Mn;
$(Tb_{(1-X-Y)}(Y, La, Gd, Sm)_X(Ce, Pr, Nd, Sm, Eu, Gd, Dy, Ho, Er, Tm, Yb, Lu)_Y)_3(Al, Ga, In)_2O_{12}$.

Silicate-based Phosphors $(Mg, Ba, Sr, Ca, Zn)_2SiO_4$:Eu, Ce, Mn, Ti, Pb, Sn, Li, Pr; $(Mg, Ba, Sr, Ca)SiO_4$:Eu, Ce, Mn, Ti, Pb, Sn, Li, Pr; $(Mg, Ba, Sr, Ca)SiO_3$:Eu, Ce, Mn, Ti, Pb, Sn, Li, Pr;
$ZrSiO_4$:Pr; $Ca_3Sc_2Si_3O_{12}$:Ce; $Y_2SiO_5$:Tb; $Y_2Si_2O_7$:Tb; $CaMgSiO$:Ce; $Ca_2MgSi_2O_7$:Ce; $(Ca, Sr)_2Al_2SiO_7$:Ce; $SrAl_2Si_2O_8$:Eu; $CaMgSi_2O_6$:Eu; $SrAl_{10}SiO_{20}$:Eu; $Sr_3MgSi_2O_8$:Eu; $Sr_{1..3}Mg_{0.7}SiO_4$:Eu; $(Ba, Sr, Ca)_3MgSi_2O_8$:Eu; $Y_2SiO_5$:Ce; $Sr_2Si_3O_8\cdot2SrCl_2$:Eu; $BaSi_2O_5$:Eu; $Sr_3MgSi_2O_7$:Eu.

Phosphate-based and Halophosphate-based Phosphors $Zn_2(PO_4)_2$:Mn; $(Mg, Ba, Ca, Sr)_5(PO_4)_3Cl$:Eu, Sm, Ce; $(Sr, Ca, Eu)_{10}(PO_4)_6Cl_2\cdot0.24B_2O_3$.

Borate-based Phosphors $(Y, Gd, La, Lu)BO_3$:Eu, Sm, Ce, Bi;
$Y(Mg, Ba, Ca, Sr)_3(Al, Ga, In)_3B_4O_{15}$:Eu; $YCa_3Ga_3B_4O_{15}$:Eu Aluminate-based and Gallate-based Phosphors $(Y, Gd)_3(Al, Ga)_5O_{12}$:Eu, Ce, Pr; $(Mg, Ba, Ca, Sr)MgAl_{10}O_{17}$:Eu, Mn; $(Ca, Mg, Ba, Zn)(Ga, Al)_2O_4$:Mn, Eu, Dy; $(Ba, Mg, Ca, Sr)MgAl_{14}O_{23}$:Mn, Eu; $(Mg, Ba, Ca, Sr)Al_{12}O_{19}$:Mn; $BaMg_2Al_{16}O_{27}$:Eu, Mn; $ZnGa_2O_4$:Mn; $(Li_{0.5}Ga_{0.5})_{0.5}Zn_{0.5}Ga_2O_4$ Molybdate-based and Tungstate-based Phosphors $(Li, K, Na, Ag)Eu_{(1-X)}(Y, La, Gd)_X(W, Mo)_2O_8$;
$(Li, K, Na, Ag)Eu_{(1-X)}(Y, La, Gd)_X(W, Mo)_2O_8$:Sm;
$CaWO_4$:Tb, Pb Fluoride-based Phosphors $(KF, MgF_2)$:Mn, $MgF_2$:Mn, $(Zn, Mg)F_2$:Mn;
$3.5MgO\cdot0.5MgF_2\cdot GeO_2$:Mn;
$Mg_4(F)(Ge, Sn)O_6$:Mn;

Sulfide-based Phosphors $(Be, Mg, Ca, Sr, Ba, Zn)S$:Eu, Ce, Cu, Ag, Al, Au, Tb, Cl, Pr, Mn, Bi;
$(Be, Mg, Ca, Sr, Ba, Zn)(Al, Ga, In, Y, La, Gd)_2S_4$:Eu, Ce, Cu, Ag, Al, Tb, Cl, Pr, Mn;
$(Mg, Ca, Sr, Ba)_2(Zn, Si, Ge, Sn)S_3$:Eu;
$(Mg, Ca, Sr, Ba)_2(Al, Ga, In, Y, La, Ga)_2S_3$:Eu Sulfoselenide-based Phosphors $(Be, Mg, Ca, Sr, Ba, Zn)Se_XS_{1-X}$:Eu, Ce, Cu, Ag, Al, Tb, Cl, Pr, Mn;
$(Be, Mg, Ca, Sr, Ba, Zn)(Al, Ga, In, Y, La, Gd)_2(Se_XS_{1-X})_4$:Eu, Ce, Cu, Ag, Al, Tb, Cl, Pr, Mn;

TABLE 2 further classifies the phosphor composition into various groups. For example, the groups can be Oxide-based phosphor, Silicate-based phosphor, Phosphate-based phosphor, Borate-based phosphor, Aluminate-based phosphor, Gallate-based phosphor, Molybdate-based phosphor, Tungstate-based phosphor, Fluoride-based phosphor, Sulfide-based phosphor, and Sulfoselenide-based phosphor.

Mixtures of the phosphors or organic material described above can be used to adjust the CIE coordinates of the emitted light. These mixtures can include the following:

1. A mixture of a few additional red phosphors with different composition to an existing red phosphor in order to adjust the CIE coordinates of the red components of the screen.

2. A mixture of a few additional green phosphors with different composition to an existing green phosphor can be used to adjust the CIE coordinates of the green components of the screen.

3. A mixture of a few additional blue phosphors with different compositions to an existing blue phosphor can be used to adjust the CIE coordinates of the blue components of the screen.

4. A mixture including various amounts of mixtures 1, 2, and 3 above.

5. A mixture of the green and blue phosphors with red phosphor to adjust the CIE coordinates of the red components of the screen.

6. A mixture of the red and blue phosphors with green phosphor to adjust the CIE coordinates of the green components of the screen.

7. A mixture of the green and red phosphors with blue phosphor to adjust the CIE coordinates of the blue components of the screen.

9. A mixture of organic material to any of the mixtures 1-8 to adjust the CIE coordinates of the color screen.

Various amounts of the red, green, and blue phosphors can be combined to achieve a white color. The exact amount of each color component can depend on factors such as the excitation wavelength of the light source, excitation intensity (e.g., power of the excitation source), the CIE chromaticity of component colors, the desired brightness of the "white" color. Thus, for applications in which the excitation light source is below about 420 nm, the white phosphor composition can be adjusted to accommodate for changes in the absorption characteristics of the phosphors at different excitation wavelengths. One example of obtaining a white phosphor mixture can include combining ZnS:Ag with (Zn, Cd)S:Cu, Al. Another example can include combining ZnS:Ag with $Zn_2SiO_4$:Mn and $(Zn, Mg)_3(PO_4)_2$:Mn to achieve a white phosphor.

Other examples of white phosphor compositions can include $8SrCO_3.4CaCO_3.11Al_2O_3.0.18Eu_2O_3$ (~white); $3Ca_3(PO_4)_2.Ca(F, Cl)_2$:Sb (~bluish white); $3Ca_3(PO_4)_2.Ca(F, Cl)_2$:Sb, Mn (~white); $3Ca_3(PO_4)_2.Ca(F, Cl)_2$:Sb (warm white); $BaO.TiO_2P_2O5$ (~bluish white); and $MgWO4$ (~bluish white). Additional white phosphor compositions can be obtained from commercial vendors such as GELCORE, LEUCHTSTOFFWERK, and PHILIPS. For instance, a white phosphor composition of $Ca_2NaV_3Mg_2O_{12}$:$Eu^{3+}$ can be obtained from GELCORE. Further, PHILIPS has demonstrated using a blue LED (emission wavelength ~460 nm-470 nm) to excite a combination of $SrGa_2S_4$:Eu and $AE_2Si_5N_8$:Eu or a combination of $SrGa_2S_4$:Eu and AES:Eu to achieve white color.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A display device, comprising a display screen that includes a fluorescent layer that absorbs an excitation light at a single excitation wavelength and emits visible light, the fluorescent layer comprising:
   a plurality of parallel fluorescent stripes elongated along a first direction and spaced from one another along a second direction perpendicular to the first direction, wherein at least three adjacent fluorescent stripes are made of three different fluorescent materials: a first fluorescent material that absorbs the excitation light and emits light of a first color, a second fluorescent material that absorbs the excitation light and emits light of a second color, and a third fluorescent material that absorbs the excitation light and emits light of a third color;
   a plurality of diode lasers that respond to respective laser current control signals to produce modulated laser excitation beams of the excitation light at the single excitation wavelength, one modulated laser excitation beam from each diode laser per one laser current control signal carrying images of different colors in the respective laser current control signal;
   a controller that generates the laser current control signals that respectively carry images and are applied to the diode lasers;
   a beam scanning mechanism that receives the modulated laser beams at the single excitation wavelength and scans, simultaneously and along the second direction, the modulated laser excitation beams on to the display screen at different and adjacent screen positions along the first direction in one screen segment of the display screen, to produce different scan lines along the second direction, respectively, in the screen segment, to cause fluorescent layer of the display screen to emit light of the first, second and third colors at different times at different positions in each scan line along the second direction produced by each modulated laser excitation beam and, to shift, simultaneously, the modulated laser excitation beams to other screen segments at different positions in the display screen along the first direction, one screen segment at a time, to render the images; and
   a relay optics module placed in optical paths of the modulated laser beams between the diode lasers and the beam scanning mechanism to modify and direct the modulated laser beams in a way to be scanned along the first and second directions onto the display screen by the beam scanning mechanism,
   wherein one of the different fluorescent materials in the fluorescent stripes includes an Oxide-based phosphor, a Silicate-based phosphor, a Phosphate-based phosphor, a Borate-based phosphor, an Aluminate-based phosphor, a Gallate-based phosphor, a Molybdate-based phosphor, a Tungstate-based phosphor, a Fluoride-based phosphor, a Sulfide-based phosphor, and a Sulfoselenide-based phosphor.

2. A display device, comprising a display screen that includes a fluorescent layer that absorbs an excitation light at a single excitation wavelength and emits visible light, the fluorescent layer comprising:
   a plurality of parallel fluorescent stripes elongated along a first direction and spaced from one another along a second direction perpendicular to the first direction, wherein at least three adjacent fluorescent stripes are made of three different fluorescent materials: a first fluorescent material that absorbs the excitation light and emits light of a first color, a second fluorescent material that absorbs the excitation light and emits light of a second color, and a third fluorescent material that absorbs the excitation light and emits light of a third color;
   a plurality of diode lasers that respond to respective laser current control signals to produce modulated laser excitation beams of the excitation light at the single excitation wavelength, one modulated laser excitation beam from each diode laser per one laser current control signal carrying images of different colors in the respective laser current control signal;
   a controller that generates the laser current control signals that respectively carry images and are applied to the diode lasers; and
   a beam scanning mechanism that receives the modulated laser beams at the single excitation wavelength and scans, simultaneously and along the second direction, the modulated laser excitation beams on to the display screen at different and adjacent screen positions along the first direction in one screen segment of the display screen, to produce different scan lines along the second direction, respectively, in the screen segment, to cause fluorescent layer of the display screen to emit light of the first, second and third colors at different times at different positions in each scan line along the second direction produced by each modulated laser excitation beam and, to shift, simultaneously, the modulated laser excitation beams to other screen segments at different positions in the display screen along the first direction, one screen segment at a time, to render the images,
   wherein one of the different fluorescent materials in the fluorescent stripes includes an Oxide-based phosphor, a Silicate-based phosphor, a Phosphate-based phosphor, a Borate-based phosphor, an Aluminate-based phosphor, a Gallate-based phosphor, a Molybdate-based phosphor, a Tungstate-based phosphor, a Fluoride-based phosphor, a Sulfide-based phosphor, and a Sulfoselenide-based phosphor,
   wherein the Silicate-based phosphor comprises at least one of $(Mg, Ba, Sr, Ca, Zn)_2SiO_4$:(Eu, Ce, Mn, Ti, Pb, Sn, Li, Pr); $(Mg, Ba, Sr, Ca)SiO_4$:Eu, Ce, Mn, Ti, Pb, Sn, Li, Pr; $(Mg, Ba, Sr, Ca)SiO_5$:Eu, Ce, Mn, Ti, Pb, Sn, Li, Pr; $ZrSiO_4$:Pr; $Ca_3Sc_2Si_3O_{12}$:Ce; $Y_2SiO_5$:Tb; $Y_2Si_2O_7$:Tb; $CaMgSiO$:Ce; $Ca_2MgSi_2O_7$:Ce; $(Ca, Sr)_2Al_2SiO_7$:Ce; $SrAl_2Si_2O_8$:Eu; $CaMgSi_2O_6$:Eu; $SrAl_{10}SiO_{20}$:Eu; $Sr_3MgSi_2O_8$:Eu; $Sr_{1.3}Mg_{0.7}SiO_4$:Eu; $(Ba, Sr, Ca)_3MgSi_2O_8$:Eu; $Y_2SiO_5$:Ce; $Sr_2Si_3O_8.2SrCl_2$:Eu; $BaSi_2O_5$:Eu; and $Sr_3MgSi_2O_7$:Eu.

3. The device as in claim 1, wherein the Phosphate-based phosphor comprises at least one of $Zn_2(PO_4)_2$:Mn; $(Mg, Ba, Ca, Sr)_5(PO_4)_3Cl$:(Eu, Sm, Ce); and $(Sr, Ca, Eu)_{10}(PO_4)_6 Cl_2.0.24B_2O_3$.

4. The device as in claim 1, wherein the Borate-based phosphor comprises at least one of $(Y, Gd, La, Lu)BO_3$:Eu, Sm, Ce, Bi; $Y(Mg, Ba, Ca, Sr)_3(Al, Ga, In)_3B_4O_{15}$:Eu; and $YCa_3Ga_3B_4O_{15}$:Eu.

5. The device as in claim 1, wherein the Aluminate-based phosphor comprises at least one of $(Y, Gd)Al_5O_{12}$:(Eu, Ce, Pr); $(Mg, Ba, Ca, Sr)MgAl_{10}O_{17}$:(Eu, Mn); $(Ca, Mg, Ba, Zn)Al_2O_4$:(Mn, Eu, Dy); $(Ba, Mg, Ca, Sr)MgAl_{14}O_{23}$:Mn, Eu; $(Mg, Ba, Ca, Sr)Al_{12}O_{19}$:Mn; and $BaMg_2Al_{16}O_{27}$:Eu, Mn.

6. The device as in claim 1, wherein the Gallate-based phosphor comprises at least one of (Y, Gd)$_3$Ga$_5$O$_{12}$:(Eu, Ce, Pr); (Ca, Mg, Ba, Zn)Ga$_2$O$_4$:(Mn, Eu, Dy); ZnGa$_2$O$_4$:Mn; and (Li$_{0.5}$Ga$_{0.5}$)$_{0.5}$Zn$_{0.5}$Ga$_2$O$_4$.

7. The device as in claim 1, wherein the Molybdate-based phosphor comprises at least one of (Li, K, Na, Ag)Eu$_{(1-X)}$(Y, La, Gd)$_X$Mo$_2$O$_8$ and(Li, K, Na, Ag)Eu$_{(1-X)}$(Y, La, Gd)$_X$Mo$_2$O$_8$:Sm.

8. The device as in claim 1, wherein the Tungstate-based phosphor comprises at least one of (Li, K, Na, Ag)Eu$_{(1-X)}$(Y, La, Gd)$_X$W$_2$O$_8$;(Li, K, Na, Ag)Eu$_{(1-X)}$(Y, La, Gd)$_X$W$_2$O$_8$:Sm; and CaWO$_4$:Tb, Pb.

9. The device as in claim 1, wherein the Fluoride-based phosphor comprises at least one of (KF, MgF$_2$):Mn, MgF$_2$:Mn, (Zn, Mg)F$_2$:Mn; 3.5MgO.0.5MgF$_2$.GeO$_2$:Mn; and Mg$_4$(F)(Ge, Sn)O$_6$:Mn.

10. The device as in claim 1, wherein the Sulfide-based phosphor comprises at least one of (Be, Mg, Ca, Sr, Ba, Zn)S:(Eu, Ce, Cu, Ag, Al, Au, Tb, Cl, Pr, Mn, Bi); (Be, Mg, Ca, Sr, Ba, Zn)(Al, Ga, In, Y, La, Gd)$_2$S$_4$:(Eu, Ce, Cu, Ag, Al, Tb, Cl, Pr, Mn); (Mg, Ca, Sr, Ba)$_2$(Zn, Si, Ge, Sn)S$_3$:Eu; and (Mg, Ca, Sr, Ba)$_2$(Al, Ga, In, Y, La, Ga)$_2$S$_3$:Eu.

11. The device as in claim 1, wherein the Sulfoselenide-based phosphor comprises at least one of (Be, Mg, Ca, Sr, Ba, Zn)Se$_X$S$_{1-X}$:(Eu, Ce, Cu, Ag, Al, Tb, Cl, Pr, Mn) and (Be, Mg, Ca, Sr, Ba, Zn)(Al, Ga, In, Y, La, Gd)$_2$(Se$_X$S$_{1-X}$)$_4$:(Eu, Ce, Cu, Ag, Al, Tb, Cl, Pr, Mn).

12. A display device, comprising:
a display screen having a fluorescent layer formed of fluorescent regions that absorb excitation light at an excitation wavelength and emit visible light, two adjacent fluorescent regions formed of different materials that emit visible light of different colors;
an array of lasers that respectively produce excitation laser beams of the excitation light at the excitation wavelength, each excitation laser beam modulated to carry time-domain coded image information for a colored image to be displayed on the display screen; and
a beam scanning mechanism that receives the excitation laser beams and simultaneously scans the excitation laser beams onto the display screen at different display screen positions in a first direction to scan the excitation laser beams in a second direction to cause emission of visible light of different colors in different fluorescent regions at different times and different positions along each scan line in the second direction to produce the colored image on the display screen,
wherein the display screen further includes a contrast enhancement layer positioned to filter the visible light emitted by the fluorescent layer for forming images displayed by the display screen to one or more viewers, the contrast enhancement layer including different filtering regions that spatially align with and match respective fluorescent regions in the fluorescent layer and each filtering region transmitting light of a color that is emitted by a corresponding matching fluorescent region and blocking light of other colors,
wherein a fluorescent region of the display screen includes:
a Silicate-based phosphor which includes (Mg, Ba, Sr, Ca, Zn)$_2$SiO$_4$:(Eu, Ce, Mn, Ti, Pb, Sn, Li, Pr); (Mg, Ba, Sr, Ca)SiO$_4$:Eu, Ce, Mn, Ti, Pb, Sn, Li, Pr; (Mg, Ba, Sr, Ca)SiO$_5$:Eu, Ce, Mn, Ti, Pb, Sn, Li, Pr; ZrSiO$_4$:Pr; Ca$_3$Sc$_2$Si$_3$O$_{12}$:Ce; Y$_2$SiO$_5$:Tb; Y$_2$Si$_2$O$_7$:Tb; CaMgSiO: Ce; Ca$_2$MgSi$_2$O$_7$:Ce; (Ca, Sr)$_2$Al$_2$SiO$_7$:Ce; SrAl$_2$Si$_2$O$_8$:Eu; CaMgSi$_2$O$_6$:Eu; SrAl$_{10}$SiO$_{20}$:Eu; Sr$_3$MgSi$_2$O$_8$:Eu; Sr$_{1\ \ .3}$Mg$_{0.7}$SiO$_4$:Eu; (Ba, Sr, Ca)$_3$MgSi$_2$O$_8$:Eu; Y$_2$SiO$_5$:Ce; Sr$_2$Si$_3$O$_8$.2SrCl$_2$:Eu; BaSi$_2$O$_5$:Eu; or Sr$_3$MgSi$_2$O$_7$:Eu; or a Phosphate-based phosphor which includes Zn$_2$(PO$_4$)$_2$:Mn; (Mg, Ba, Ca, Sr)$_5$(PO$_4$)$_3$Cl:(Eu, Sm, Ce); or (Sr, Ca, Eu)$_{10}$(PO$_4$)$_6$Cl$_2$.0.24B$_2$O$_3$; or a Borate-based phosphor which includes (Y, Gd, La, Lu)BO$_3$:Eu, Sm, Ce, Bi; Y(Mg, Ba, Ca, Sr)$_3$(Al, Ga, In)$_3$B$_4$O$_{15}$:Eu; or YCa$_3$Ga$_3$B$_4$O$_{15}$:Eu; or an Aluminate-based phosphor which includes (Y, Gd)$_3$Al$_5$O$_{12}$:(Eu, Ce, Pr); (Mg, Ba, Ca, Sr)MgAl$_{10}$O$_{17}$:(Eu, Mn); (Ca, Mg, Ba, Zn)Al$_2$O$_4$:(Mn, Eu, Dy); (Ba, Mg, Ca, Sr)MgAl$_{14}$O$_{23}$:Mn, Eu; (Mg, Ba, Ca, Sr)Al$_{12}$O$_{19}$:Mn; or BaMg$_2$Al$_{16}$O$_{27}$:Eu, Mn; or a Gallate-based phosphor which includes (Y, Gd)$_3$Ga$_5$O$_{12}$:(Eu, Ce, Pr); (Ca, Mg, Ba, Zn)Ga$_2$O$_4$:(Mn, Eu, Dy); ZnGa$_2$O$_4$:Mn; or (Li$_{0.5}$Ga$_{0.5}$)$_{0.5}$Zn$_{0.5}$Ga$_2$O$_4$,; or a Molybdate-based phosphor comprises at least one of (Li, K, Na, Ag)Eu$_{(1-X)}$(Y, La, Gd)$_X$Mo$_2$O$_8$ or (Li, K, Na, Ag)Eu$_{(1-X)}$(Y, La, Gd)$_X$Mo$_2$O$_8$:Sm; or a Tungstate-based phosphor which includes (Li, K, Na, Ag)Eu$_{(1-X)}$(Y, La, Gd)$_X$W$_2$O$_8$; (Li, K, Na, Ag)Eu$_{(1-X)}$(Y, La, Gd)$_X$W$_2$O$_8$:Sm; or CaWO$_4$:Tb, Pb; or a Fluoride-based phosphor which includes (KF, MgF$_2$):Mn, MgF$_2$:Mn, (Zn, Mg)F$_2$:Mn; 3.5MgO.0.5MgF$_2$.GeO$_2$; or Mg$_4$(F) (Ge, Sn) O$_6$:Mn, or a Sulfide-based phosphor which includes (Be, Mg, Ca, Sr, Ba, Zn)S:(Eu, Ce, Cu, Ag, Al, Au, Tb, Cl, Pr, Mn, Bi); (Be, Mg, Ca, Sr, Ba, Zn)(Al, Ga, In, Y, La, Gd)$_2$S$_4$:(Eu, Ce, Cu, Ag, Al, Tb, Cl, Pr, Mn); (Mg, Ca, Sr, Ba)$_2$(Zn, Si, Ge, Sn)S$_3$:Eu; or (Mg, Ca, Sr, Ba)$_2$(Al, Ga, In, Y, La, Ga)$_2$S$_3$:Eu; or a Sulfoselenide-based phosphor which includes (Be, Mg, Ca, Sr, Ba, Zn)Se$_X$S$_{1-X}$:(Eu, Ce, Cu, Ag, Al, Tb, Cl, Pr, Mn) or (Be, Mg, Ca, Sr, Ba, Zn)(Al, Ga, In, Y, La, Gd)$_2$(Se$_X$S$_{1-X}$)$_4$:(Eu, Ce, Cu, Ag, Al, Tb, Cl, Pr, Mn).

13. The display device as in claim 12, wherein:
the different fluorescent regions of the display screen emit visible light of red, green and blue colors, and
each excitation laser beam carries time-domain coded image information for the red, green and blue colors for each color pixel formed by three adjacent fluorescent regions at different horizontal positions.

14. The device as in claim 12, wherein:
a fluorescent region of the display screen comprises a non-phosphor organic material.

15. The device as in claim 14, wherein:
the organic material includes Brilliantsulfoflavine FF, Basic yellow HG, Eosine, Rhodamine 6G, or Rhodamine B.

16. The device as in claim 1, wherein:
the relay optics module is configured to modify spatial property of the modulated laser beams from the diode lasers to produce a closely packed bundle of modulated laser beams for scanning by the beam scanning mechanism.

17. The device as in claim 1, further comprising:
a scan lens placed between the beam scanning mechanism and the display screen to project the scanned and modulated laser beams on to the display screen.

* * * * *